United States Patent [19]
Heidari

[11] Patent Number: 5,172,325
[45] Date of Patent: Dec. 15, 1992

[54] METHOD FOR BALANCING ROTATING MACHINERY

[75] Inventor: Mohammad A. Heidari, Bellevue, Wash.

[73] Assignee: The Boeing Company, Seattle, Wash.

[21] Appl. No.: 561,882

[22] Filed: Aug. 2, 1990

[51] Int. Cl.⁵ ............................................. G01M 1/22
[52] U.S. Cl. .................................. 364/463; 364/508; 73/462
[58] Field of Search ................. 364/508, 565; 73/462, 73/468, 469, 470, 660, 593

[56] References Cited

U.S. PATENT DOCUMENTS

| | | | |
|---|---|---|---|
| 4,162,634 | 7/1979 | Hofmann | 73/462 |
| 4,345,472 | 8/1982 | Hara et al. | 73/462 |
| 4,435,770 | 3/1984 | Shiohata et al. | 364/508 |
| 4,457,172 | 7/1984 | Mathes et al. | 73/462 |
| 4,485,678 | 12/1984 | Fanuele | 73/660 |
| 4,488,240 | 12/1984 | Kapadia et al. | 364/508 |
| 4,502,328 | 3/1985 | Wood et al. | 73/462 |
| 4,535,411 | 8/1985 | Blackburn et al. | 364/508 |
| 4,608,650 | 8/1986 | Kapadia | 364/508 |
| 4,683,542 | 7/1987 | Taniguti | 364/508 |
| 4,926,341 | 5/1990 | Guyot | 364/508 |
| 4,984,173 | 1/1991 | Imam et al. | 364/508 |

FOREIGN PATENT DOCUMENTS 555310 7/1977 U.S.S.R. .

Primary Examiner—Thomas G. Black
Attorney, Agent, or Firm—Bruce A. Kaser

[57] ABSTRACT

The invention described here provides a method for obtaining the "best" solution to balancing engine vibration where one or more corrective weights are applied to accessible stage of an engine, while other unbalanced stages remain inaccessible, and hence, no balancing weights can be applied there. The method involves placing balancing weights at accessible stages only, but taking into account vibration at such stages which is created by unbalances at the inaccessible stages. The method is practiced by calculating the angular limits for placing a corrective weight onto an engine stage, followed by calculating the minimum and maximum weight magnitude to be placed on the stage so that overall engine vibration remains below a certain desired level (D). Thereafter, the optimum weight and angular position is determined by minimizing D via a procedure of incremental calculations.

4 Claims, 6 Drawing Sheets

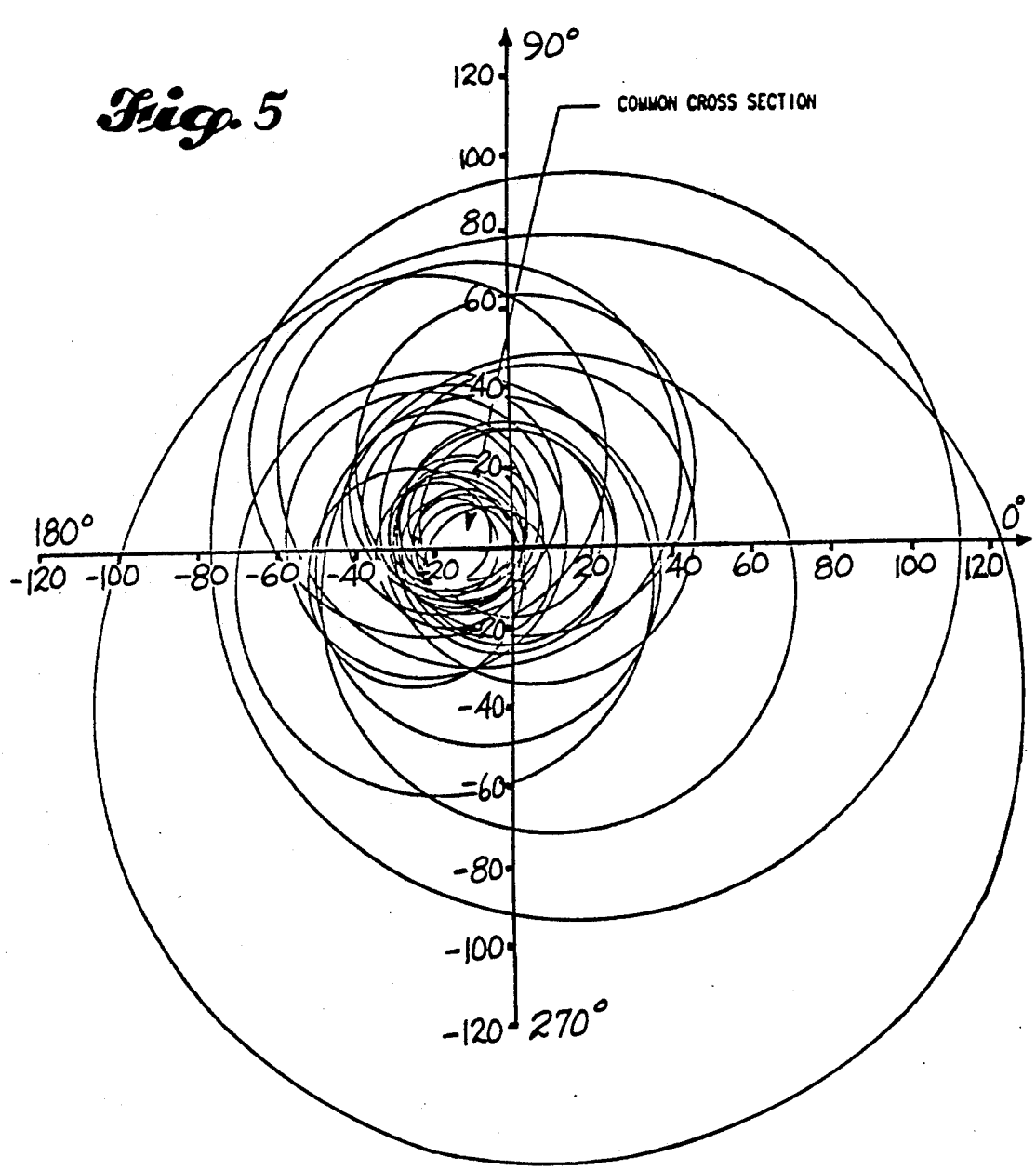

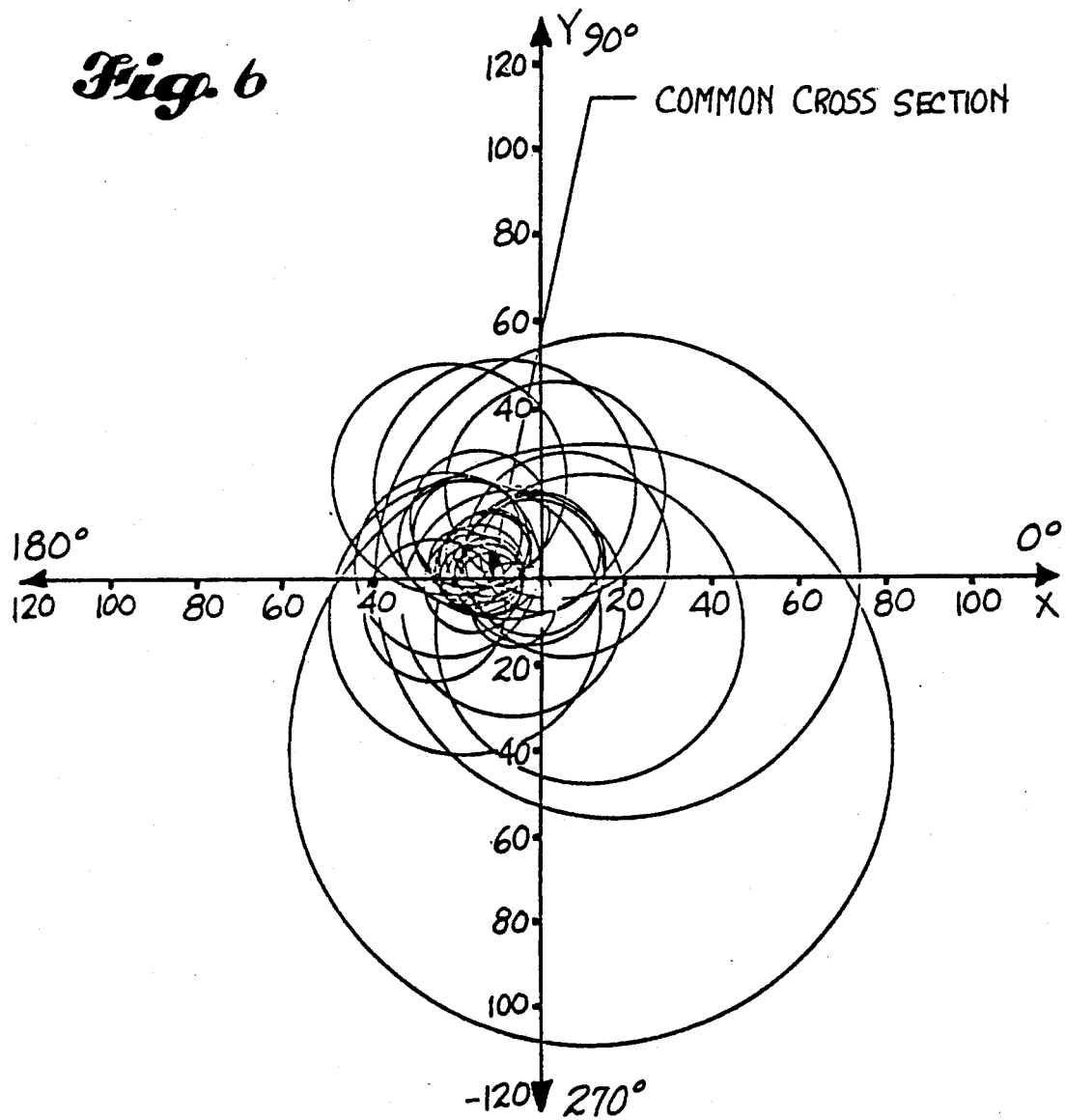

| AIRPLANE / ENGINE POSITION | AS-RECEIVED PEAK VIBRATION, MILS S.A. | | NUMBER OF TRIAL RUNS REQUIRED | PEAK VIBRATION AFTER BALANCE, MILS S.A. | | BALANCE REQUIRED MAGN (OZ-IN) / LOC (DEG) | |
|---|---|---|---|---|---|---|---|
| | A-FLANGE | P-FLANGE | | A-FLANGE | P-FLANGE | FAN | LPT |
| 747 / RT571 ENGINE 4 | 0.84 | 1.78 | 1 | 0.54 | 1.10 | 0 | 17.2 (−133) |
| 767 / VN173 ENGINE 1 | 1.00 | 1.70 | 1 | 0.50 | 0.90 | 0 | 17.2 (−60) |
| 747 / RT571 ENGINE 2 | 1.47 | 0.94 | 1 | 0.63 | 0.58 | 11.4 (170) | 0 |
| 747 / RT503 ENGINE 3 | 1.26 | 1.35 | 1 | 1.08 | 1.02 | 15.6 (199) | 8.6 (6) |
| 767 / VN154 ENGINE 1 | 1.30 | 1.51 | 1 | 0.39 | 0.62 | 14.3 (19) | 8.6 (191) |
| 767 / VN155 ENGINE 1 | 1.13 | 1.44 | 3 | 0.78 | 0.90 | 0 | 20.1 (211) |
| *747 / RT405 ENGINE 1 | 1.20 | 1.10 | 3 | 1.30 | 1.52 | 15 (19) | 0 |
| 747 / RT405 ENGINE 2 | 1.08 | 1.67 | 1 | 0.74 | 0.92 | 10 (190) | 12.9 (8) |
| 747 / RT405 ENGINE 3 | 1.08 | 1.51 | 2 | 0.66 | 0.93 | 0 | 8.6 (132) |
| 747 / RT406 ENGINE 3 | 1.59 | 2.06 | 1 | 1.18 | 1.37 | 6 (104) | 12.9 (160) |
| 747 / RT406 ENGINE 2 | 1.50 | 1.40 | 1 | 0.90 | 1.20 | 5 (19) | 12.9 (250) |
| *747 / RT602 ENGINE 2 | 1.68 | 2.10 | 1 | 1.10 | 1.94 | 10.8 (142) | 12.9 (6) |
| 747 / RT602 ENGINE 4 | 2.00 | 1.40 | 1 | 1.30 | 1.20 | 10 (85) | 8.6 (40) |

  AFTER THE AS-RECEIVED RUN

\* VIBRATIONS WERE LOWER IN SQUAWKED RPMS AFTER BALANCING

*Fig. 7*

METHOD FOR BALANCING ROTATING MACHINERY

TECHNICAL FIELD

The invention disclosed here relates to methods for solving dynamic unbalances of rotating bodies, and is particularly directed to unbalances in elongated shaft-like structures which carry variable masses at different stages along their length.

BACKGROUND OF THE INVENTION

It is either impossible or nearly impossible, as a practical matter, to build a rotating structure that is perfectly balanced upon manufacture. Any such structure will produce a certain amount of undesired vibration to a greater or lesser extent. Such vibration is usually passed through mounts that restrain the rotating part of the structure, and can therefore manifest itself as unwanted noise or vibration in adjacent structures.

A common example of this kind of problem is found in the modern high-bypass gas turbine engine presently used in commercial aviation. Vibration caused by unbalances in the various stages of such engine not only creates higher wear and fatigue in engine components and surrounding structures, but also causes unwanted noise in the passenger cabin of the airplane. Consequently, the manufacturers of such engines have developed special weights that can be affixed to the rotating fan and/or low pressure turbine (LPT) portions of each engine, as a means of balancing it, for controlling the magnitude of its unwanted vibration.

A person skilled in the art would know that the above-identified engine has numerous stages along its length. Typically, only the fan and LPT stages are accessible for applying weights after the engine is manufactured or assembled. Internal stages are inaccessible as a practical matter. Therefore, the specially developed balancing weights mentioned above are usable only for the fan and LPT stages. Some manufacturers provide corrective weights for the fan stage only, while others provide weights for both the fan and LPT stages.

Although fan and LPT unbalances, alone and by themselves, contribute to engine vibration as a whole, the unbalances that often reside at internal, inaccessible engine stages also contribute to overall engine vibration. When corrective weights can only be placed on the two accessible stages (fan and LPT), it is difficult to select weights of the proper magnitude and angular position such that they not only function to reduce vibration caused by the specific unbalances there, but also reduce the influence of unbalances at internal stages as well. Consequently, past methods of engine balancing have been frustrating, time consuming, and subject to a good deal of trial and error.

The balancing method disclosed here takes advantage of the modern digital computer, and an algorithm for solving what is mathematically known as a "minimization problem." While a "best" solution to engine vibration may not exist that can completely compensate for all sources or stages of engine unbalance, the present invention provides a "best" solution that will guarantee a lowest peak vibration for a range of engine RPMs.

The method disclosed here removes all trial and error guesswork to engine balancing. Although it was developed specifically for gas turbine engines, it is to be appreciated that such method could be applied to balance other types of rotating structures as well.

SUMMARY OF THE INVENTION

The invention is a method of determining the smallest (or minimum) value of maximum vibration (min—max) that can be achieved by applying certain corrective balancing weights to certain accessible stages of a rotating body, where the balancing achieved by such weights accounts not only for unbalances at such stages, but also takes into account the effect on maximum vibration of unbalances at certain inaccessible stages of the body. The invention involves a minimization technique that first requires placement of at least one vibration sensor pickup at a certain location on the supporting housing which carries the rotating body. Vibration is transmitted into the supporting housing as the body rotates, and is detected by the sensor pickup, to provide a measurement of both vibrational amplitude and phase at such location.

In accordance with the invention, the sensor pickup is first used to measure a maximum as-built vibrational amplitude ($U_{max}$) at the pickup location. In other words, the sensor pickup measures the maximum vibration of the housing which is caused by rotation of the body prior to balancing. Thereafter, a certain vibrational amplitude (D) is selected, wherein such amplitude has a value that is less than the maximum as-built vibrational amplitude ($U_{max}$).

The rotating body has several stages distributed along its length, some of which are accessible for the application of corrective weights, others are not. Regardless of accessibility, however, all stages affect overall engine vibration. For any given RPM of the body, there are certain absolute limits with respect to how any one corrective weight may be angularly oriented on an accessible stage so as to counteract, to a greater or lesser degree, overall as-built vibration of the body. Such absolute angular limits are first calculated for the selected D for a given RPM. Then, the common angular limits are calculated for a range of RPMs of the body. These are subset of the absolute limits. In other words, the range of the angular limits may broaden or narrow at different RPMs, but there will be one range common to all at any RPM where a corrective weight may be applied to achieve D at most.

Thereafter, the lower and higher limits of the magnitude of the corrective weight for one accessible stage is calculated for angular orientations within the common limits based on achieving D at most. This provides a range of weights, and angular orientations for such weight, that will provide a balanced vibration no greater than D, and takes into account overall unbalances at all stages (accessible or inaccessible). However, within such range is a "best" weight and orientation that provides an achievable lowest maximum vibrational amplitude ($D_{min-max}$) at the pickup location that is less tha D. Such optimized balanced vibration ($D_{min-max}$), along with the corresponding corrective weight magnitude and angular location to achieve it, constitute the optimum solution for balancing vibration of the rotating body when a corrective weight can be applied only to an accessible stage.

The invention may be used for multiple stages and/or multiple pickup locations. When corrective weights are applied to more than one stage, the best balanced amplitude ($D_{min-max}$) is determined by incrementing the magnitude and angular orientation of the corrective weight at a first stage, and for each increment, calculating the best corrective weight to be applied to another stage, including its corresponding resultant amplitude, via the above-described procedure. Then the best combined weight/orientation solution is taken from the solutions reached after all corrective weight increments have been made at the first stage.

The invention as summarized above will become more fully understood to the skilled person upon consideration of the following description which is to be taken in conjunction with the drawings.

BRIEF DESCRIPTION OF THE DRAWINGS

In the drawings, like reference numerals and letters refer to like parts throughout the various views, unless indicated otherwise, and wherein:

FIG. 5 is a view similar to FIG. 2, but shows a typical fan corrective weight map for the engine of FIG. 1 for all RPMs and both pickups of such engine, and for a certain selected balanced vibrational amplitude limit (D=1.0 mil);

FIG. 6 is a view like FIG. 5, but shows how a minimization technique may be used to determine the optimum fan corrective weight and location to reduce the balanced vibrational amplitude of the engine shown in FIG. 1 to a minimum ($D_{min-max}$); and FIG. 7 is a chart showing actual test results obtained by using the method in accordance with the invention.

BEST MODE FOR CARRYING OUT THE INVENTION

Figure 1:
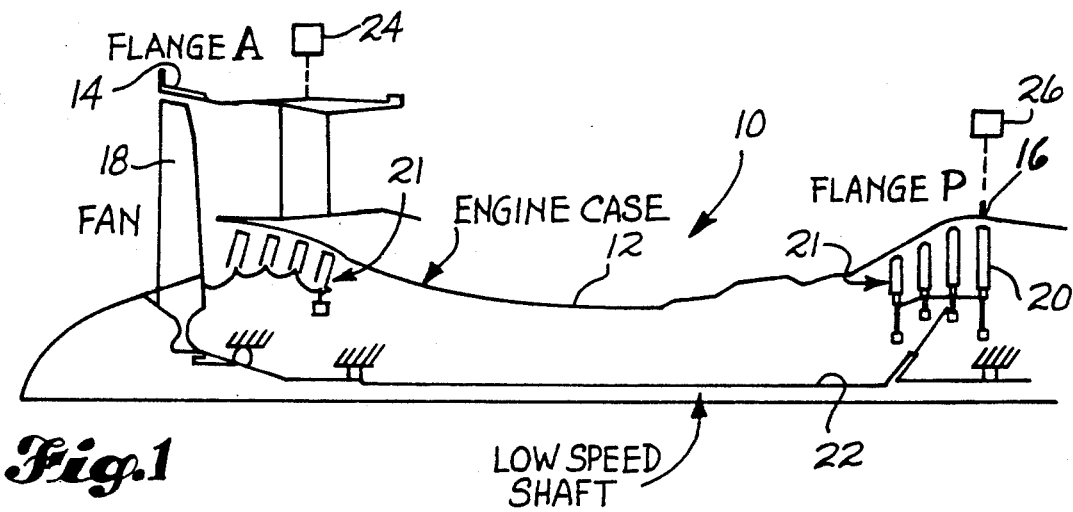
FIG. 1 is a schematic view of a Pratt and Whitney Model PW4000 high-bypass gas turbine engine that is presently used on commercial jets, and shows the engine halved along an axis of symmetry corresponding to the axis of rotation of its rotating parts, and further schematically shows the locations where vibration of such engine are preferably measured in accordance with the invention disclosed here.

Referring now to the drawings, and first to FIG. 1, therein is shown at 10 a high-bypass gas turbine engine. Although the construction of such engine 10 would be generally familiar to a person skilled in the art, briefly, the engine has an engine case or housing 12 which defines an airflow path through the engine. Generally, the engine is mounted to surrounding aircraft structure by a pair of flanges 14, 16. These flanges are typically referred to as the "A" flange, indicated at 14, and the "P" flange, indicated at 16. Sometimes such letter designations will be used herein instead of reference numeral designations.

As would also be familiar to the skilled person, the engine 10 has a forward fan stage 18, and a rearward low pressure turbine stage (LPT) 20. These stages 18, 20 are respectively located adjacent the A and P flanges. Distributed along the length of the engine's low speed shaft 22 are a plurality of other stages located inwardly of the fan 18 and LPT 20. These are generally indicated at 21. Such stages 21 are generally inaccessible once the engine 10 has been manufactured.

A balancing method in accordance with the invention accounts for the effects of plane unbalances at the fan and LPT stages 18, 20, and the other plane unbalances caused by the inaccessible stages 21. The as-built vibration of the engine 10 at any location in the engine is due to all of such unbalances although, as the skilled person would know, some stages typically affect the overall unbalance more than others. The influences of unbalances of the fan and LPT stages 18, 20 (hereafter usually referred to as "influence coefficients") can be obtained by recording changes in vibration or vibrational response at the A and P flanges as a result of adding sample weights to such stages, which involves measuring vibration response via conventional sensor pickups 24, 26.

In order to practice the invention, any engine that has unacceptably high unbalances after manufacture is first run on the ground, to measure its as-built vibration via sensor pickups 24, 26. These measurements are taken over the engine's operating range of speeds (RPMs). Such data is recorded only when the engine is operating at a stationary or steady-state RPM, and it is best to keep vibration data from pickups 24, 26 as noise free as possible.

The influence coefficients at the recording locations or pickups 24, 26 are the response (in mils) to a unit weight (ounce-inch) at the balancing plane or planes. Sometimes recording locations are indicated here by the subscript "i," where i=1, for example, corresponds to pickup 24, and i=2 corresponds to pickup 26.

In the present case, the balancing planes are the fan 18 and LPT 20. A preferable method of calculating influence coefficients for such planes or stages is to use measured data from the engine 10 as built, and two trial runs, where data from each trial run is obtained from sensor pickups 24, 26 after placing trial weights on one or both balancing planes (fan 18 and LPT 20).

The measured vibration $\overline{U}_i$ (i=1,2) at the two pickup locations 24, 26 can be written as follows:

$$\overline{U}_i = \overline{R}_{if} \times \overline{FAN} + \overline{R}_{it} \times \overline{LPT} + \sum_{j=1,n} \overline{d}_{ij} \qquad \text{eq. (1)}$$

where, (-)=symbol designating a complex quantity
$\overline{U}_i$=as received vibration at pickup i (i=1,2)
$\overline{R}_{if}$=pickup i influence coefficient due to fan stage unbalance (response mils/unit fan unbalance ounce-inch) (i=1,2)
$\overline{R}_{it}$=pickup i influence coefficient due to turbine stage unbalance (response mils/unit turbine unbalance ounce-inch) (i=1,2)
$\overline{FAN}$=residual fan unbalance (ounce-inch)
$\overline{LPT}$=residual turbine unbalance (ounce-inch)
$\overline{d}_{ij}$=vibration at pickup i due to unbalance at inaccessible plane j
n=number of planes with unbalance that are inaccessible Assuming $(\overline{U}_e)_i = \Sigma \overline{d}_{ij}$=total vibration at pickup i due to unbalances in other inaccessible planes, influence coefficients $\overline{R}_{if}$ and $\overline{R}_{it}$ may be calculated by applying sample fan and turbine weights in two trials as follows:

$$(\overline{U_i})_1 = (\overline{FAN} + \overline{\Delta FAN_1})\overline{R}_{if} + (\overline{LPT} + \overline{\Delta LPT_1})\overline{R}_{it} + (\overline{U}_e)_i \quad \text{eq. (2)}$$
(trial 1)

$$(\overline{U_i})_2 = (\overline{FAN} + \overline{\Delta FAN_2})\overline{R}_{if} + (\overline{LPT} + \overline{\Delta LPT_2})\overline{R}_{it} + (\overline{U}_e)_i \quad \text{eq. (3)}$$
(trial 2)

where,
$\overline{\Delta FAN}_j$ (j=1,2)=added weight to the fan at trial j
$\overline{\Delta LPT}_j$ (j=1,2)=added weight to the turbine at trial j
$(\overline{U}_i)_j$ (j=1,2)=pickup i vibration at trial j Subtracting eq. (2) and eq. (3), respectively, from eq. (1) results in:

$$(\overline{U_i})_1 - \overline{U}_i = (\overline{\Delta FAN_1})\overline{R}_{if} + (\overline{\Delta LPT_1})\overline{R}_{it}$$
$$(\overline{U_i})_2 - \overline{U}_i = (\overline{\Delta FAN_2})\overline{R}_{if} + (\overline{\Delta LPT_2})\overline{R}_{it}$$

$$\begin{Bmatrix} (\overline{U_i})_1 - \overline{U}_i \\ (\overline{U_i})_2 - \overline{U}_i \end{Bmatrix} = \begin{bmatrix} \overline{\Delta FAN_1} & \overline{\Delta LPT_1} \\ \overline{\Delta FAN_2} & \overline{\Delta LPT_2} \end{bmatrix} \begin{Bmatrix} \overline{R}_{if} \\ \overline{R}_{it} \end{Bmatrix}$$
measured    Applied weights
(known)     (known)

OR $$\begin{Bmatrix} \overline{R}_{if} \\ \overline{R}_{it} \end{Bmatrix} = \begin{bmatrix} \overline{\Delta FAN_1} & \overline{\Delta LPT_1} \\ \overline{\Delta FAN_2} & \overline{\Delta LPT_2} \end{bmatrix} \begin{Bmatrix} (\overline{U_i})_1 - \overline{U}_i \\ (\overline{U_i})_2 - \overline{U}_i \end{Bmatrix} \quad \text{eq. (4)}$$

Thus, the influence coefficients can be calculated since the actual corrective weights added during any trial run are known ($\Delta FAN_j$ and $\Delta LPT_j$), and the resultant change in vibration is also known because it can be measured at pickups 24, 26.

In theory, the influence coefficients should not vary from one engine to another given that the engines are of the same type or model. However, due to nonlinearity factors, manufacturing tolerances and measurement errors, the influence coefficients are generally never exactly identical for different engines of the same model. Therefore, the method disclosed here could be implemented by a simple averaging of influence coefficients calculated for a number of engines, to obtain a so-called generic influence coefficient usable for most engines with some level of confidence, or more exact influence coefficients can be calculated for each engine in the above-described manner.

Figure 3:
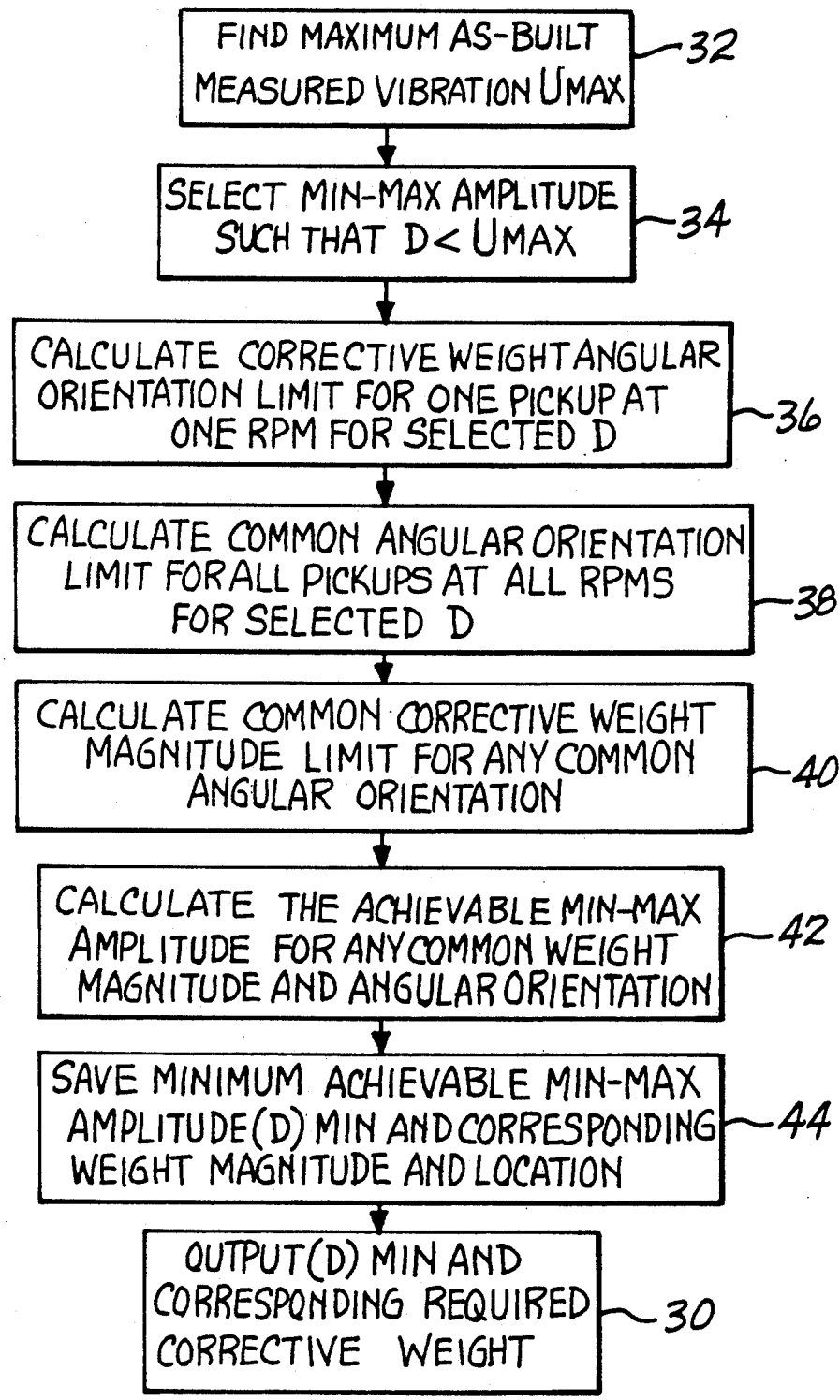
FIG. 3 is a flow chart illustrating how fan or LPT corrective weights may be calculated in accordance with the invention for balancing the engine shown in FIG. 1.

Attached hereto as an appendix is a computer program, written in Fortran, that has the capability of using as-built measured data provided by sensor pickups 24, 26, and either generic or calculated influence coefficients, as inputs for determining both the location and magnitude of corrective weights to be attached to either the fan 18 or LPT 20 stages, for reducing engine vibration. The backbone or gist of the method is to find a corrective weight that guarantees the lowest peak vibration ($D_{min-max}$) at both pickups 24, 26 over the selected engine speed range. The computer program accomplishes this via an algorithm procedure that is divided into two separate parts as follows:

In the first part, which is illustrated in FIG. 3, the ($D_{min-max}$) algorithm procedure defines fundamental steps of a minimization technique that can achieve a unique min—max amplitude which, as mentioned above, is the minimum achievable peak vibration amplitude between all pickups 24, 26 over a selected range of engine speeds.

The first step is to determine the maximum as-built measured vibration ($U_{max}$) which is measured via pickups 24, 26 (see 32 in FIG. 3). Second, an arbitrary selection of an amplitude after balancing (D) is selected, such that D is less than $U_{max}$ (see 34 in FIG. 3). Then, as indicated at 36, 38, 40, 42 in FIG. 3, an optimum corrective weight, and angular location for such weight, is calculated that provides the lowest possible maximum vibration ($D_{min-max}$), accounting for the effects of unbalances at the fan 18, LPT 20 and inaccessible stages 21. Such calculation optimizes $D_{min-max}$ for a range of RPMs, or across a selected speed range, and is done for either the fan 18 or the LPT 20. The mathematical derivation required for such calculation, as applied to the fan 18, for example, is shown below:

$$(\overline{U_i})' = \overline{U}_i + \overline{R}_{if} \times \overline{\Delta FAN} \quad \text{eq. (5)}$$

where,
$(U_i)'$ = new vibration at pickup i due to added corrective weight

Equation (5) above can be rewritten into a quadratic equation in terms of corrective fan weight and an arbitrary selection of D substituted for $/(\overline{U_i})'/$, such that $D < U_{max}$, as follows:

$$D = [|\overline{U}_i|^2 + 2*|\overline{U}_i|*|\overline{R}_{if}|*|\overline{\Delta FAN}|*\cos(\phi_i - \psi_{if} - \phi_f) + (|\overline{R}_{if}|^2 * |\overline{\Delta FAN}|^2)]^{\frac{1}{2}} \quad \text{eq. (6)}$$

where,
$\psi_{if}$ = pickup i influence coefficient phase with respect to Fan unbalance
$\phi_f$ = phase (angular orientation of corrective FAN weight
$\phi_i$ = as-built vibration phase of pickup i Assuming, $$X = \overline{\Delta FAN}*\cos(\phi_f)$$

$$Y = \overline{\Delta FAN}*\sin(\phi_f),$$

Figure 2:
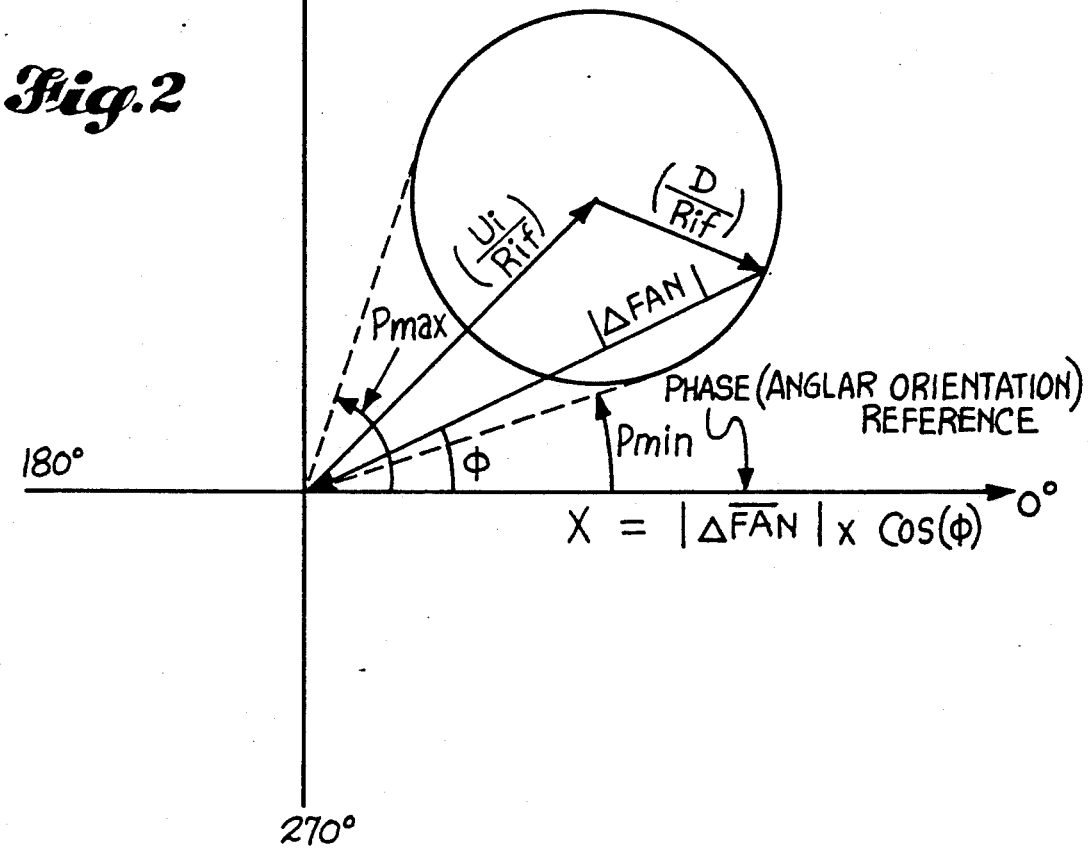
FIG. 2 is a graph showing a typical corrective fan weight map for a given vibration sensor pickup and a particular rotational speed of the engine shown in FIG. 1.

Equation (6) can be rewritten in the following circular equation $$\left[X + \frac{|\overline{U}_i|*\cos(\theta)}{|\overline{R}_{if}|}\right]^2 + \left[Y + \frac{|\overline{U}_i|\sin(\theta)}{|\overline{R}_{if}|}\right]^2 = \left[\frac{D}{|\overline{R}_{if}|}\right]^2 \quad \text{eq. (7)}$$

where, $\theta = \phi_i - \psi_{if}$
$-|\overline{U}_i|\cos(\theta)/|\overline{R}_{if}|$ = X-component of circular centroid
$-|\overline{U}_i|\cos(\theta)/|\overline{R}_{if}|$ = Y-component of circular centroid
$(D/|\overline{R}_{if}|)$ = Radius of the circle for pickup i The above equation (eq. (7)) is circular and, by way of example, corresponds to a circular map of corrective weight for the fan stage 18 for either pickup 24, 26 for one RPM. This is illustrated in FIG. 2. A similar map could be constructed for the LPT stage 20 by substituting LPT weights for fan weights, and LPT influence coefficients for fan influence coefficients.

As shown in FIG. 2, the area inside the circle represents all possible corrective weight magnitudes and angular orientations that can be applied at a corrective stage (the fan stage, in the example given) to generate a vibration amplitude that is equal to or less than the selected balanced amplitude (D) for the corresponding pickup (24 or 26) and a selected RPM.

As is shown in FIG. 5, a different map could be constructed for various RPMs over a selected range. The common area inside all of the circles represents a common corrective weight and angular orientation that has the capability of bringing the engine's vibrational amplitude under the selected amplitude D for all pickups at all RPMs. In theory, the area of such common section can be reduced by lowering D, such that only one weight/orientation solution exists to achieve the best possible balanced vibration ($D_{min-max}$). This is illustrated by way of example in FIG. 6.

To summarize the first part of the algorithm, after the maximum as-built measured vibration ($U_{max}$) is determined, and the arbitrary selection of D is made, the algorithm mathematically determines the limits of angular orientation ($P_{max}$ to $P_{min}$ in FIG. 2) for any corrective weight (e.g. fan) required to reduce the vibration of a pickup 24, 26 to a level that is at or below the amplitude D (see 36 in FIG. 3). This step is performed for both pickups 24, 26 where the as-built vibration amplitude ($U_i$) is greater than D at any RPM.

Then, as shown at 38 in FIG. 3, the algorithm calculates the common angular limits in accordance with the step just described, between all pickups 24, 26 and at all engine RPMs. Each angular orientation within the common limits does not necessarily guarantee a vibration amplitude that is less than D. However, it will cover all possible angles where the corrective weight should be located.

Next, as shown at 40 in FIG. 3, the algorithm calculates the lower and higher limits of the corrective weight magnitude (e.g. fan) for any angular orientation within the common angular limits determined in the step above, by solving the quadratic equation set forth above in eq. (7) for all pickups 24, 26 and all RPMs.

It should be understood that each angular orientation within the common angular limits may not have a common corrective weight between both pickups 24, 26 that provides a balanced vibration that is less than D at all RPMs. Hence, new common angular orientation limits must be calculated conditioned upon having a common corrective weight limit for each angle that can achieve D at most. Such new angular orientation limit is a subset of the one mentioned above.

The algorithm calculates the min−max amplitude ($D_{min-max}$) for each angular orientation and each corrective weight by using a practical choice of incremental values for both angular orientations and corrective weight magnitudes (see 42 in FIG. 3). Then, once calculated, the minimum $D_{min-max}$ is saved for output to the user (see 44 in FIG. 3).

The second part of the algorithm involves calculating the combined weights on both the fan 18 and LPT 16. When calculating the combination weight to be applied at both the fan 18 and LPT 16, the weight at both stages is obtained by incrementing one weight magnitude and phase (e.g. LPT) (see 46 in FIG. 4), and modifying as-built vibrations pursuant to the equation below:

$$(\overline{U}_i)_{new} = \overline{U}_i + \overline{R}_{it} \times \Delta\overline{LPT} \qquad \text{eq. (8)}$$

where,
$(\overline{U}_i)_{new}$ = modified vibration at pickup i
$(\overline{U}_i)$ = measured as-built vibration at pickup i
$\overline{R}_{it}$ = vibration influence coefficient of pickup i due to added weight (LPT)
$\Delta\overline{LPT}$ = turbine added weight Thereafter, the magnitude and orientation of the other corrective weight (e.g. fan in the example given) is calculated using the first part of the algorithm technique described above. The best min−max limit after such calculation is then saved, with corresponding weight magnitudes and angular orientations. The corrective weight for the LPT stage is then incremented through an allowable range and the best min−max limit is correspondingly and incrementally determined through the range. From this information, the absolute best min−max limit is determined.

Figure 4:
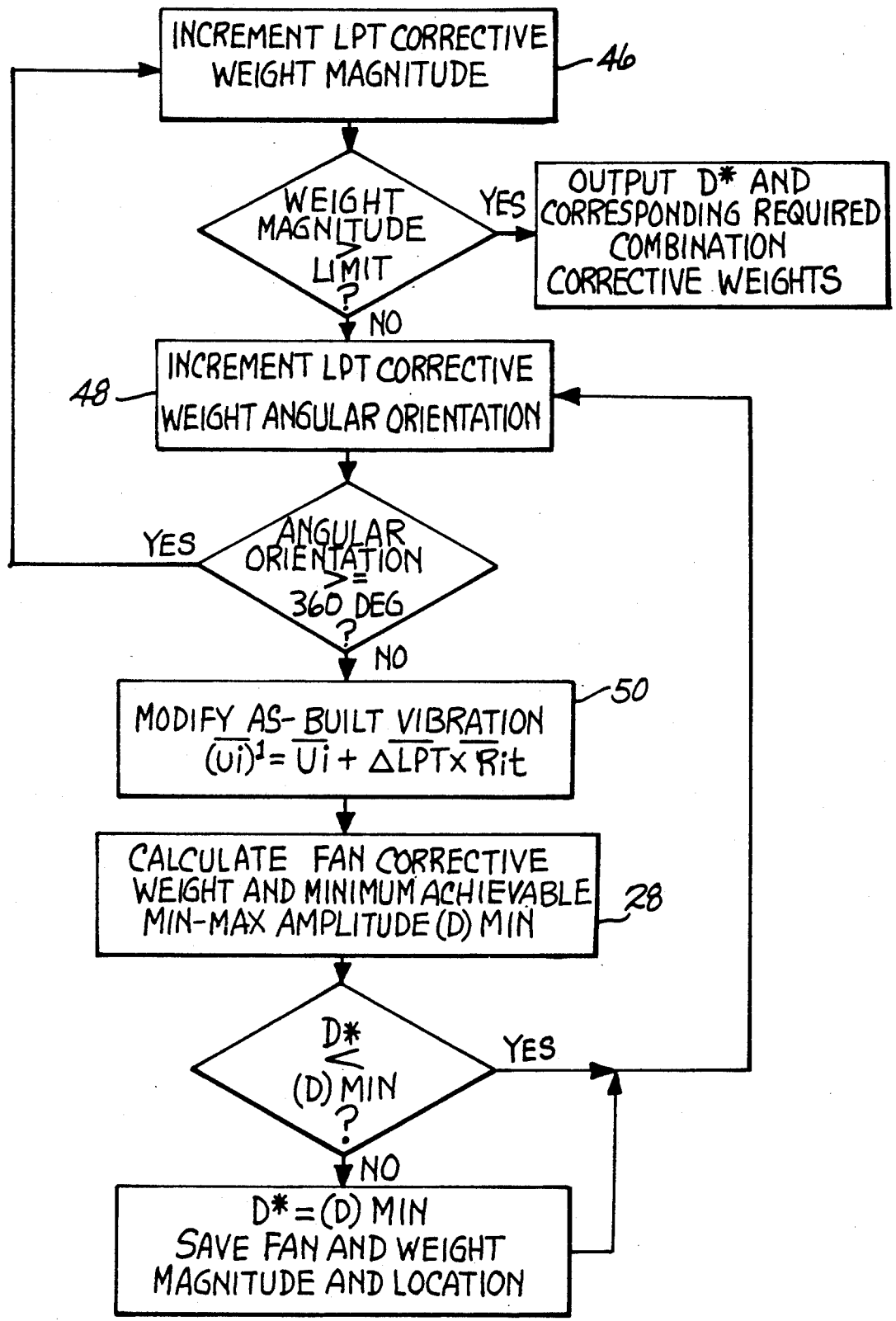
FIG. 4 is a flow chart showing how combined corrective weights applied to both the fan and LPT stages of the engine shown in FIG. 1 may be calculated in accordance with the invention.

FIG. 4 illustrates the flow chart for such procedure which is incorporated in the program of the computer program appendix. The block in FIG. 4 indicated at 28 corresponds to the output received at 30 in FIG. 3. Numerals 48 and 50 respectively indicate the above-described incremental procedure, and the utilization of eq. (8).

The above-described method was applied successfully to balance thirteen consecutive PW4000 engines on Boeing (trademark) 667-300 and 747-400 airplanes. FIG. 7 shows the number of trials used to balance these engines, and the maximum peak vibration before and after balancing.

Referring again to FIG. 5, it shows illustrative weight map circles intersecting at a common location for D=1.0 mil, which was obtained by using the manufacturer's fan corrective weights on a RT571/PW4000 engine, along with 767 generic influence coefficients. Also, FIG. 6 shows the intersection of equivalent circles for the same engine, minimized to obtain the best min−max level of D=0.595 mil.

The preceding description presents the currently-known best mode for carrying out the invention. It is to be understood that certain changes could be made to the invention without departing from the spirit and scope of what is considered to be patentable. Therefore, it is to be understood that none of the above description is to be taken in a limiting sense. Instead, the scope of any and all patent rights obtained here is to be defined by the subjoined claims, wherein such claims are to be interpreted in view of the well-established doctrines of patent claim interpretation.

```
C    BIND -B BEARING BEARING.BIN

C
C        PROGRAM OPT_2.FTN
C****************************************************************
C TO FIND COMBINED UNBALANCES   FOR MINIMUM VIBRATION
C
C                                         WRITTEN BY M.A. HEIDARI
C****************************************************************
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT
      COMPLEX RFV(2,20),RLV(2,20),A0(2,20),A0N(2,20),WTA,DET,A11,A12
      COMPLEX A21,A22,RFAN,RTURB,RFFV(2,20),RLLV(2,20)
      DIMENSION AV0(2,20),PV0(2,20),PFV0(2,20),FREQ1(20),FREQ2(20)
      DIMENSION RESP(20),NCOUNT(20),NLOW(20),RA(2,20),PA(2,20),IFREQ(20)
      CHARACTER*28 BASE,ICGEN,OUT,VGS,TRIAL1,TRIAL2,INFLCO
      CHARACTER*1 ANS,SEL,DEAR,ANSA,ANSAP
      WRITE(*,*)'      *********************************************'
      WRITE(*,*)'      *               OPTBAL                      *'
      WRITE(*,*)'      *             (Version 6.0)                 *'
      WRITE(*,*)'      *             MAY 18,1990                   *'
      WRITE(*,*)'      *         ENGINE BALANCING PROGRAM          *'
      WRITE(*,*)'      *       BOEING COMMERCIAL AIRPLANES         *'
      WRITE(*,*)'      *           PROPULSION RESEARCH             *'
      WRITE(*,*)'      *         WRITTEN BY M.A. HEIDARI           *'
      WRITE(*,*)'      *********************************************'
      WRITE(*,*)' '
      WRITE(*,*)' '

WRITE(*,*)' '
C     SELECT UNIT FOR ENGINE SPEEDS 8-28-89
C
      WRITE(*,123)
  123 FORMAT(' SELECT ENGINE SPEED UNIT',//5X,
     *8H1) HERTZ,/5X,'2) RPM',//' INPUT YOUR CHOICE NO. -->'$)

READ(*,*)ISPEED
C     SELECT UNIT FOR BASELINE ANT TRIAL INPUT FILES   8-28-89
C
      WRITE(*,122)
  122 FORMAT(' SELECT BASELINE AND TRIAL FILES VIBRATION UNIT',//5X
     *6H1) G'S,/5X,'2) MILS',//' INPUT YOUR CHOICE NO. -->'$)

READ(*,*)IUNIT

WRITE(*,*)'ENTER THE NAME OF THE BASELINE INPUT FILE'
      READ(*,20)BASE
      WRITE(*,222)
  222 FORMAT(' SELECT INFLUENCE COEFFICIENT METHOD CALCULATION',
     *//5X,'1)GENERIC',/5X,'2)GENERIC WITH ONE TRIAL',/5X,
     $'3)TWO TRIALS',/)
      WRITE(*,723)
  723 FORMAT(' INPUT YOUR CHOICE NO.-->'$)
      READ(*,*)IC
C
      OPEN(UNIT=1,FILE=BASE,STATUS='OLD')

10 FORMAT(A1)
   20 FORMAT(A28)
      ONE=1.
      PI=ACOS(-ONE)
```

```
C      NUMBER OF VIBRATION PICKUPS

NMV=2

C      ********* READING VIRATION DATA FROM INPUT FILE ***************

VMAX=0.
       READ(1,920)
920    FORMAT(2(/))

DO 8010 J=1,100
       READ(1,*,END=300)FREQ2(J),(AV0(K,J),PFV0(K,J),K=1,2)
       IF(ISPEED.EQ.1)FREQ1(J)=FREQ2(J)
       IF(ISPEED.EQ.2)IFREQ(J)=FREQ2(J)
       IF(ISPEED.EQ.2)FREQ1(J)=FREQ2(J)/60.
       DO 915 KK=1,NMV
       IF(IUNIT.EQ.1)AV0(KK,J)=AV0(KK,J)*9778.5074/((FREQ1(J))**2)
       IF(AV0(KK,J).GT.VMAX)VMAX=AV0(KK,J)
915    CONTINUE
8010   CONTINUE
300    CONTINUE

CLOSE(UNIT=1)
       NFR=J-1

C*******************************************************************

DO 2111 J=1,NFR
       DO 2111 I=1,NMV
       PV0(I,J)=PFV0(I,J)*PI/180.
       A0(I,J)=CMPLX(AV0(I,J)*COS(PV0(I,J)),AV0(I,J)*SIN(PV0(I,J)))
       A0N(I,J)=A0(I,J)
2111   CONTINUE

IF(IC.EQ.3)GOTO 223
       WRITE(*,*)'ENTER THE NAME OF GENERIC INFL. CO. FILE'
       READ(*,20)ICGEN
       OPEN(UNIT=2,FILE=ICGEN,STATUS='OLD')

READ(2,921)
921    FORMAT(1(/))
       DO 1903 J=1,NFR
       READ(2,*)FRE,(AFI(K,J),PFI(K,J),ALI(K,J),PLI(K,J),K=1,2)
1903   CONTINUE

CLOSE(UNIT=2)

DO 1904 J=1,NFR
       DO 1904 I=1,NMV
       PFI(I,J)=PFI(I,J)*PI/180.
       PV1=PFI(I,J)
       PLI(I,J)=PLI(I,J)*PI/180.
       PV2=PLI(I,J)
       RFV(I,J)=CMPLX(AFI(I,J)*COS(PV1),AFI(I,J)*SIN(PV1))
       RLV(I,J)=CMPLX(ALI(I,J)*COS(PV2),ALI(I,J)*SIN(PV2))
1904   CONTINUE

IF(IC.EQ.1)GOTO 227

223    CALL ICS(IC,A0,RFFV,RLLV,KW,TRIAL1,TFAN1,PFAN1,TLPT1,
      *PLPT1,TRIAL2,TFAN2,PFAN2,TLPT2,PLPT2,IUNIT,ISPEED)
       IF(IC.EQ.2)GOTO 225
       DO 326 I=1,NMV
       DO 326 J=1,NFR
       RFV(I,J)=RFFV(I,J)
       RLV(I,J)=RLLV(I,J)
326    CONTINUE
```

```
              GOTO 227
225           CONTINUE
              IF(KW.EQ.1)GOTO 226
              DO 324 I=1,NMV
              DO 324 J=1,NFR
              RLV(I,J)=RLLV(I,J)
324           CONTINUE

GOTO 227
226           CONTINUE
              DO 325 I=1,NMV
              DO 325 J=1,NFR
              RFV(I,J)=RFFV(I,J)
325           CONTINUE

227           CONTINUE
C***************************************************************

DO 238 I=1,NMV
              DO 238 J=1,NFR
              AFI(I,J)=((REAL(RFV(I,J)))**2+(AIMAG(RFV(I,J)))**2)**0.5
              IF(AFI(I,J).EQ.0.)GOTO 4444
              PFI(I,J)=ATAN2(AIMAG(RFV(I,J)),REAL(RFV(I,J)))
              GOTO 9777
4444          PFI(I,J)=0.
9777          ALI(I,J)=((REAL(RLV(I,J)))**2+(AIMAG(RLV(I,J)))**2)**0.5
              IF(ALI(I,J).EQ.0.)GOTO 5999
              PLI(I,J)=ATAN2(AIMAG(RLV(I,J)),REAL(RLV(I,J)))
              GOTO 238
5999          PLI(I,J)=0.
238           CONTINUE

IF(ISPEED.EQ.1)WRITE(*,791)
791           FORMAT(' DO YOU WANT TO ENTER THE FREQUENCY RANGE ? (Y/N)')
              IF(ISPEED.EQ.2)WRITE(*,792)
792           FORMAT(' DO YOU WANT TO ENTER THE SPEED RANGE ? (Y/N)')
              READ(*,10)ANS
              IF(ANS.EQ.'Y'.OR.ANS.EQ.'y')GOTO 21
              GOTO 3900
21            CONTINUE
              IF(ISPEED.EQ.2)WRITE(*,793)
793           FORMAT(' ENTER LOW AND HIGH SPEED LIMIT IN RPM  (F1,F2)')
              IF(ISPEED.EQ.1)WRITE(*,794)
794           FORMAT(' ENTER LOW AND HIGH FREQUENCY LIMIT IN HERTZ  (F1,F2)')

READ(*,*)F1,F2
              IF(ISPEED.EQ.2)F1=F1/60.
              IF(ISPEED.EQ.2)F2=F2/60.
22            CONTINUE
              KC1=0
              KC2=0
              DO 2900 I=1,NFR
              IF(FREQ1(I).GE.F1.AND.KC1.EQ.0)GOTO 2901
              GOTO 2903
2901          KC1=1
              NF1=I
2903          CONTINUE
              IF(FREQ1(I).GT.F2.AND.KC2.EQ.0)GOTO 2902
              GOTO 2900
2902          KC2=2
              NF2=I-1
2900          CONTINUE
              GOTO 2905
3900          NF1=1
              NF2=NFR
2905          CONTINUE
```

```
        IF(F2.GE.FREQ1(NFR))NF2=NFR
C*****************************************************************************
        IF(IC.EQ.1)GOTO 808
        WRITE(6,649)
649     FORMAT(' ENTER THE NAME OF CALCULATED INFLUENCE ',
     *'COEFFICIENT FILE')
        READ(*,20)INFLCO
        OPEN(UNIT=7,FILE=INFLCO,STATUS='UNKNOWN')
        IF(IC.EQ.2)WRITE(7,610)TRIAL1
610     FORMAT('$CALCULATED INFLUENCE COEFFICIENT FILE WITH ',
     *'GENERIC AND ONE TRIAL',/'$TRIAL FILE  = ',A10)
        IF(IC.EQ.3)WRITE(7,611)TRIAL1,TRIAL2
611     FORMAT('$CALCULATED INFLUENCE COEFFICIENT FILE WITH ',
     *'TWO TRIALS',/'$TRIAL 1 FILE = ',A10,5X,'TRIAL 2 FILE = ',A10)

DO 612 J=1,NFR
        PH1=PFI(1,J)*180./PI
        PH2=PLI(1,J)*180./PI
        PH3=PFI(2,J)*180./PI
        PH4=PLI(2,J)*180./PI
        WRITE(7,630)FREQ2(J),AFI(1,J),PH1,ALI(1,J),PH2,AFI(2,J),PH3,
     *ALI(2,J),PH4
612     CONTINUE
630     FORMAT(F6.1,2X,F6.4,1X,F7.2,1X,F6.4,1X,F7.2,1X,F6.4,1X,F7.2,1X,
     *F6.4,1X,F7.2,1X)
C*****************************************************************************

808     CONTINUE

C1*************    A-FLANGE INPUT    5/19/90    *******************
        WRITE(*,*)'DO YOU WANT TO INPUT A-FLANGE LIMIT (Y/N) ?'
        READ(*,10)ANSA
        IOPT=0
        IOPTS=0
        IOPTSR=0

IF(ANSA.EQ.'Y'.OR.ANSA.EQ.'y') GOTO 871
        GOTO 872
871     IOPT=1
        WRITE(6,573)
573     FORMAT(' DO YOU WANT SUMMARY RESULTS WITHOUT ',
     *'A-FLANGE LIMIT(Y/N) ?')
        READ(*,10)ANSAP
        IF(ANSAP.EQ.'Y'.OR.ANSAP.EQ.'y')GOTO 874
          WRITE(6,873)
873     FORMAT(/,' INPUT MAX. A-FLANGE ---> '$)
        READ(*,*)ALIMIT
        WRITE(6,8888)
        GOTO 872
874     IOPTS=1
        IOPT=0
872     CONTINUE

C2*****************************************************************************

WRITE(*,*)'DETAIL OUTPUT   (Y/N)'
        READ(*,10)DEAR
        WRITE(*,*)'ENTER THE NAME OF OUTPUT FILE'
        READ(*,20)OUT
        WRITE(*,*)'INPUT VGS FILE NAME   XXXXXX.VGS '
        READ(*,20)VGS

OPEN(UNIT=4,FILE=VGS,STATUS='UNKNOWN')
        OPEN(UNIT=3,FILE=OUT,STATUS='UNKNOWN')
```

```
C*****************************************************************
C      OUTPUT FILE FORMATS    8-23-89
       WRITE(3,1440)
       WRITE(3,41)OUT
 41    FORMAT(/,5X,'OUTPUT FILE NAME : ',A20,/)
       WRITE(3,43)BASE
 43    FORMAT(5X,'BASELINE FILE NAME : ',A20,/)
       IF(IC.EQ.1)GOTO 30
       IF(IC.EQ.2)GOTO 31
       WRITE(3,*)'     SELECTION 3 : TWO TRIALS '
       WRITE(3,*)' '
       PFAN1=PFAN1*180./PI
       PLPT1=PLPT1*180./PI

WRITE(3,61)TRIAL1,TFAN1,PFAN1,TLPT1,PLPT1
 61    FORMAT(5X,'TRIAL1 INPUT FILE : ',A20,/,
      *5X,'FAN WEIGHT = ',F5.2,' AT (',F7.2,')',/,
      $5X,'LPT WEIGHT = ',F5.2,' AT (',F7.2,')',/)
       PFAN2=PFAN2*180./PI
       PLPT2=PLPT2*180./PI

WRITE(3,62)TRIAL2,TFAN2,PFAN2,TLPT2,PLPT2
 62    FORMAT(5X,'TRIAL2 INPUT FILE : ',A20,/,
      *5X,'FAN WEIGHT = ',F5.2,' AT (',F7.2,')',/,
      $5X,'LPT WEIGHT = ',F5.2,' AT (',F7.2,')',/)

GOTO 32
 30    WRITE(3,*)'     SELECTION 1 : GENERIC'
       WRITE(3,*)' '
       WRITE(3,23)ICGEN
       GOTO 32
 31    WRITE(3,42)
 42    FORMAT(4X,'SELECTION 2 : GENERIC WITH ONE TRIAL',/)
       WRITE(3,23)ICGEN
 23    FORMAT(5X,'GENERIC INFL. CO. FILE : ',A20,/)
       PFAN1=PFAN1*180./PI
       PLPT1=PLPT1*180./PI

WRITE(3,61)TRIAL1,TFAN1,PFAN1,TLPT1,PLPT1

32    CONTINUE
C
C
C      SPEED CONVERSION   8-28-89
C

IF(ISPEED.EQ.1)WRITE(3,24)FREQ2(NF1),FREQ2(NF2)
       IF(ISPEED.EQ.2)WRITE(3,25)FREQ2(NF1),FREQ2(NF2)

24    FORMAT(5X,'FREQUENCY RANGE : ',F5.2,1X,'(HZ) TO ',F5.2,1X,'(HZ)',
      */)
 25    FORMAT(5X,'FREQUENCY RANGE : ',F6.1,1X,'(RPMS) TO ',
      *F6.1,1X,'(RPMS)',/)
       WRITE(3,44)VGS
 44    FORMAT(5X,'VGS  FILE NAME : ',A20,/)

WRITE(3,1440)
C*****************************************************************
       IF(ISPEED.EQ.1)WRITE(4,299)
       IF(ISPEED.EQ.2)WRITE(4,2299)

299       FORMAT('$ AS-RECIEVED VIBRATION FOR " A " AND " P " FLANGES',
      *  /'AS-REC.',/,'FREQ.   A-AFLNG   P-AFLNG   A-PFLNG   P-PFLNG')
```

```
2299  FORMAT('$ AS-RECIEVED VIBRATION FOR " A " AND " P " FLANGES',
     * /'AS-REC.',/,'SPEED  A-AFLNG  P-AFLNG  A-PFLNG  P-PFLNG')

DO 916 J=1,NFR
916   WRITE(4,90)FREQ2(J),AV0(1,J),PFV0(1,J),AV0(2,J),PFV0(2,J)
      WRITE(4,1012)

C*****************************************************************
C     RESIDUAL UNBALANCE
C*****************************************************************
      IF(ISPEED.EQ.1)WRITE(4,199)
      IF(ISPEED.EQ.2)WRITE(4,2199)

199   FORMAT('$ RESIDUAL UNBALANCE',/'RESID.',
     #/,'FREQ.  A-FAN  P-FAN  A-LPT  P-LPT')
2199  FORMAT('$ RESIDUAL UNBALANCE',/'RESID.',
     #/,'SPEED  A-FAN  P-FAN  A-LPT  P-LPT')

DO 1905 J=1,NFR
      DET=RFV(1,J)*RLV(2,J)-RLV(1,J)*RFV(2,J)
      A11=RLV(2,J)/DET
      A12=-RLV(1,J)/DET
      A21=-RFV(2,J)/DET
      A22=RFV(1,J)/DET
      RFAN=A11*A0(1,J)+A12*A0(2,J)
      RTURB=A21*A0(1,J)+A22*A0(2,J)
      RRFAN=((REAL(RFAN))**2+(AIMAG(RFAN))**2)**0.5
      PRFAN=ATAN2(AIMAG(RFAN),REAL(RFAN))
      RRLPT=((REAL(RTURB))**2+(AIMAG(RTURB))**2)**0.5
      PRLPT=ATAN2(AIMAG(RTURB),REAL(RTURB))

PRFAN=PRFAN*180./PI
      IF(PRFAN.LT.-180.)PRFAN=PRFAN+360.
      IF(PRFAN.GT.180.)PRFAN=PRFAN-360.

PRLPT=PRLPT*180./PI
      IF(PRLPT.LT.-180.)PRLPT=PRLPT+360.
      IF(PRLPT.GT.180.)PRLPT=PRLPT-360.

WRITE(4,90)FREQ2(J),RRFAN,PRFAN,RRLPT,PRLPT
1905  CONTINUE
90    FORMAT(F6.1,2(2X,F5.2,1X,F7.2))
      WRITE(4,1012)

C1***********
876   CONTINUE
      IF(IOPTSR.EQ.1)WRITE(6,879)
879   FORMAT(/,'DO YOU WANT TO INPUT A-FLANGE LIMIT (Y/N) ?')
      IF(IOPTSR.EQ.1)READ(*,10)ANSA

IF(IOPTSR.EQ.1.AND.ANSA.EQ.'Y')WRITE(6,873)
      IF(IOPTSR.EQ.1.AND.ANSA.EQ.'y')WRITE(6,873)
      IF(IOPTSR.EQ.1.AND.ANSA.EQ.'Y')READ(*,*)ALIMIT
      IF(IOPTSR.EQ.1.AND.ANSA.EQ.'y')READ(*,*)ALIMIT
      IF(IOPTSR.EQ.1.AND.ANSA.EQ.'Y')WRITE(6,8888)
      IF(IOPTSR.EQ.1.AND.ANSA.EQ.'y')WRITE(6,8888)
      IF(IOPTSR.EQ.1.AND.ANSA.EQ.'Y')IOPT=1
      IF(IOPTSR.EQ.1.AND.ANSA.EQ.'y')IOPT=1
      IF(IOPTSR.EQ.1)IOPTS=0
      IF(IOPT.EQ.1)WRITE(3,1440)
      IF(IOPT.EQ.1)WRITE(3,803)ALIMIT
803   FORMAT(/,'A-FLANGE LIMIT : ',F6.3,' MILS',/)
C2**************
      RBEST=1.E+8
      DO 1900 KG=1,3
      DO 1400 KGC=1,1
```

```
      DWT=1.
      IF(KG.EQ.2)DWT=4.3
      PHID=360./38.
      IF(KG.EQ.2)PHID=360./128.
      IF(KG.EQ.2)GOTO 1800
      IF(KG.EQ.3)GOTO 1500
      CALL PLIMIT(NCOUNT,RESP,NO,NLOW,A0,AON,RLV,WTA)
C***************  12-5-89
      IF(NO.EQ.0)WRITE(6,1440)
      IF(NO.EQ.0)WRITE(3,1440)

IF(NO.EQ.0)WRITE(6,8888)
      IF(NO.EQ.0)WRITE(3,8888)
 8888 FORMAT(/)
      IF(NO.EQ.0)WRITE(6,*)'NO IMPROVEMENT WITH FAN WEIGHT ONLY'
      IF(NO.EQ.0)WRITE(3,574)
  574 FORMAT('NO IMPROVEMENT WITH FAN WEIGHT ONLY')
      IF(NO.EQ.0)WRITE(6,8888)
      IF(NO.EQ.0)WRITE(3,8888)

IF(NO.EQ.0)WRITE(6,1440)
      IF(NO.EQ.0)WRITE(3,1440)
      IF(NO.EQ.0)GOTO 1400
      CALL RSPNN(NCOUNT,NO,NLOW,R,WGHT,PHASE,AON,RFV)

C***************  12-5-89
      IF(R.GT.VMAX)WRITE(6,1440)
      IF(R.GT.VMAX)WRITE(3,1440)

IF(R.GT.VMAX)WRITE(3,8888)
      IF(R.GT.VMAX)WRITE(6,8888)

IF(R.GT.VMAX)WRITE(6,*)'NO IMPROVEMENT WITH FAN WEIGHT ONLY'
      IF(R.GT.VMAX)WRITE(3,574)
      IF(R.GT.VMAX)WRITE(3,8888)
      IF(R.GT.VMAX)WRITE(6,8888)

IF(R.GT.VMAX)WRITE(6,1440)
      IF(R.GT.VMAX)WRITE(3,1440)
      IF(R.GT.VMAX)GOTO 1400

IF(RBEST.GT.R)RBEST=R
C***************************************************
C     FAN UNBALANCE IN ALL OPERATING RANGE
C***************************************************
 1204 IF(PHASE.GT.360.)PHASE=PHASE-360.
      IF(PHASE.LT.0.)PHASE=PHASE+360.
      PHASE=PHASE+.0001
      NBLADE=(PHASE/PHID)+1

C1*****************
      IF(IOPTS.EQ.1)WRITE(6,8888)
      IF(IOPTS.EQ.1)WRITE(3,8888)
      IF(IOPTS.EQ.1)WRITE(6,878)
      IF(IOPTS.EQ.1)WRITE(3,878)
  878 FORMAT(3X,'SUMMARY MAXIMUM A & P FLNAGE VIBRATIONS (MILS)',
     *' WITHOUT A-FLANGE LIMIT',//,27X,'A-FLANGE',3X,'P-FLANGE',/)

IF(IOPTS.EQ.1)CALL RMAXAP(AON,RLV,RFV,PHASE,WGHT,P2,WTF)
      IF(IOPTS.EQ.1)GOTO 1900
C2*****************

WRITE(6,1440)
      WRITE(3,1440)
```

```
      CALL RMAX(A0N,RLV,RFV,PHASE,WGHT,P2,WTF,RTOP,FRM,FREQ2,RA,PA,
     *RTOPP,FRMP)
C1*******
      IF(IOPT.EQ.1)GOTO 674
      GOTO 675
  674 CALL RNEW(A0N,RLV,RFV,PHASE,WGHT,PTF,WTF,NBLADE,NBL,ISPEED,
     *FREQ1,FREQ2,IFREQ)
      GOTO 676
  675 CONTINUE
C2******

IF(ISPEED.EQ.1)WRITE(6,8234)WGHT,NBLADE,PHASE,R,FREQ2(NF1),
     *FREQ2(NF2),RTOP,FRM
      IF(ISPEED.EQ.1)WRITE(3,1234)WGHT,NBLADE,PHASE,R,FREQ2(NF1),
     *FREQ2(NF2),RTOP,FRM
      IFRM=FRM
      IF(ISPEED.EQ.2)WRITE(6,9234)WGHT,NBLADE,PHASE,R,IFREQ(NF1),
     *IFREQ(NF2),RTOP,IFRM
      IF(ISPEED.EQ.2)WRITE(3,2234)WGHT,NBLADE,PHASE,R,IFREQ(NF1),
     *IFREQ(NF2),RTOP,IFRM

1234 FORMAT('FAN CORRECTIVE WEIGHT. = ',F5.2,'(OZ-IN)   AT BLADE # ',
     !I2,'(',F7.3,' DEG.',') ',//'MAX VIB = ',F6.3,' MILS',
     @' IN ( ',F7.3,' HZ  TO ',F7.3,' HZ) ',
     */'MAX VIB = ',F6.3,' MILS IN ALL FREQUENCY RANGE AT ',
     &F7.3,' HZ',/)
 8234 FORMAT(' FAN CORRECTIVE WEIGHT. = ',F5.2,'(OZ-IN)   AT BLADE # ',
     !I2,'(',F7.3,' DEG.',') ',//' MAX VIB = ',F6.3,' MILS',
     @' IN ( ',F7.3,' HZ  TO ',F7.3,' HZ) ',
     */' MAX VIB = ',F6.3,' MILS IN ALL FREQUENCY RANGE AT ',
     &F7.3,' HZ',/)

2234 FORMAT('FAN CORRECTIVE WEIGHT. = ',F5.2,'(OZ-IN)   AT BLADE # ',
     !I2,'(',F7.3,' DEG.',') ',//'MAX VIB = ',F6.3,' MILS',
     @' IN ( ',I4,' RPM TO ',I4,' RPM) ',
     */'MAX VIB = ',F6.3,' MILS IN ALL SPEED RANGE AT ',
     &I4,' RPM',/)
 9234 FORMAT(' FAN CORRECTIVE WEIGHT. = ',F5.2,'(OZ-IN)   AT BLADE # ',
     !I2,'(',F7.3,' DEG.',') ',//' MAX VIB = ',F6.3,' MILS',
     @' IN ( ',I4,' RPM TO ',I4,' RPM) ',
     */' MAX VIB = ',F6.3,' MILS IN ALL SPEED RANGE AT ',
     &I4,' RPM',/)

676 CONTINUE

IF(ISPEED.EQ.1.AND.IOPT.NE.1)WRITE(4,1011)WGHT,PHASE
      IF(ISPEED.EQ.2.AND.IOPT.NE.1)WRITE(4,2011)WGHT,PHASE
C1*********
      IF(ISPEED.EQ.1.AND.IOPT.EQ.1)WRITE(4,1811)ALIMIT,WGHT,PHASE
      IF(ISPEED.EQ.2.AND.IOPT.EQ.1)WRITE(4,2811)ALIMIT,WGHT,PHASE

1811 FORMAT('$FAN CORRECTIVE WEIGHT ONLY RESPONSES WITH A-FLANGE',
     #' LIMIT = ',F6.3,' MILS',/'$FAN CORRECTIVE WEIGHT = ',F5.2,
     *' (OZ-IN)',2X,'PHASE = ',F7.3,' (DEGREE)',/'FAN',/'FREQ.   ',
     ^'A-AFLNG  P-AFLNG  A-PFLNG  P-PFLNG')

2811 FORMAT('$FAN CORRECTIVE WEIGHT ONLY RESPONSES WITH A-FLANGE',
     #' LIMIT = ',F6.3,' MILS',/'$FAN CORRECTIVE WEIGHT = ',F5.2,
     *' (OZ-IN)',2X,'PHASE = ',F7.3,' (DEGREE)',/'FAN',/'SPEED   ',
     ^'A-AFLNG  P-AFLNG  A-PFLNG  P-PFLNG')

C2********
      DO 119 J=1,NFR
  119 WRITE(4,90)FREQ2(J),(RA(I,J),PA(I,J),I=1,NMV)
      WRITE(4,1012)
```

```
1011 FORMAT('$FAN CORRECTIVE WEIGHT ONLY RESPONSES',/
     #'$FAN CORRECTIVE WEIGHT = ',F5.2,' (OZ-IN)',2X,'PHASE = ',
     *F7.3,' (DEGREE)',/'FAN',/'FREQ.  A-AFLNG  P-AFLNG',
     ^'  A-PFLNG  P-PFLNG')

2011 FORMAT('$FAN CORRECTIVE WEIGHT ONLY RESPONSES',/
     #'$FAN CORRECTIVE WEIGHT = ',F5.2,' (OZ-IN)',2X,'PHASE = ',
     *F7.3,' (DEGREE)',/'FAN',/'SPEED  A-AFLNG  P-AFLNG',
     ^'  A-PFLNG  P-PFLNG')

1012 FORMAT('*EOF')
     IF(DEAR.EQ.'N'.OR.DEAR.EQ.'n')GOTO 6001

IF(ISPEED.EQ.1)CALL FORM1(NFR,NMV,RA,FREQ1)
     IF(ISPEED.EQ.2)CALL FORM3(NFR,NMV,RA,IFREQ)
6001 CONTINUE

IF(ISPEED.EQ.1)CALL FORM2(NFR,NMV,RA,FREQ1)
     IF(ISPEED.EQ.2)CALL FORM4(NFR,NMV,RA,IFREQ)

WRITE(6,1440)
     WRITE(3,1440)
1440 FORMAT(80('*'))

GOTO 1400
C*******************************************
C    LPT UNBALNCE IN ALL OPERATING RANGE
C*******************************************
1205 CALL RLPT2(AON,RLV,WTF,P2,P2NEW,R)
     P2=P2NEW
     IF(P2.GT.360.)P2=P2-360.
     IF(P2.LT.0.)P2=P2+360.
     P2=P2+.0001
     NBLADE=(P2/PHID)+1

C1*****************
     IF(IOPTS.EQ.1)CALL RMAXAP(AON,RLV,RFV,PHASE,WGHT,P2,WTF)
     IF(IOPTS.EQ.1)GOTO 1900
C2*****************

CALL RMAX(AON,RLV,RFV,PHASE,WGHT,P2,WTF,RTOP,FRM,FREQ2,RA,PA,
    *RTOPP,FRMP)
C1******
     IF(IOPT.EQ.1)GOTO 671
     GOTO 672
 671 CALL RNEW(AON,RLV,RFV,PHASE,WGHT,P2,WTF,NBLADE,NBLADE,ISPEED,
    *FREQ1,FREQ2,IFREQ)
     GOTO 673
 672 CONTINUE
C2******

IF(ISPEED.EQ.1)WRITE(6,8274)WTF,NBLADE,P2,R,FREQ2(NF1),
    *FREQ2(NF2),RTOP,FRM
     IF(ISPEED.EQ.1)WRITE(3,1274)WTF,NBLADE,P2,R,FREQ2(NF1),
    *FREQ2(NF2),RTOP,FRM
     IFRM=FRM

IF(ISPEED.EQ.2)WRITE(6,9274)WTF,NBLADE,P2,R,IFREQ(NF1),
    *IFREQ(NF2),RTOP,IFRM
     IF(ISPEED.EQ.2)WRITE(3,2274)WTF,NBLADE,P2,R,IFREQ(NF1),
    *IFREQ(NF2),RTOP,IFRM

1274 FORMAT('LPT CORRECTIVE WEIGHT = ',F5.2,' OZ-IN)  AT BLADE # ',
     !I3,'(',F7.3,' DEG.',')',//,'MAX VIB = ',F6.3,' MILS IN',
```

```
     @' ( ',F7.3,' HZ  TO ',F7.3,' HZ)',
     */'MAX VIB = ',F6.3,' MILS IN ALL FREQUENCY RANGE AT ',
     &F7.3,' HZ',/)
8274 FORMAT(' LPT CORRECTIVE WEIGHT = ',F5.2,' OZ-IN)  AT BLADE # ',
     !I3,'(',F7.3,' DEG.',')',//,' MAX VIB = ',F6.3,' MILS IN',
     @' ( ',F7.3,' HZ  TO ',F7.3,' HZ)',
     */' MAX VIB = ',F6.3,' MILS IN ALL FREQUENCY RANGE AT ',
     &F7.3,' HZ',/)

2274 FORMAT('LPT CORRECTIVE WEIGHT = ',F5.2,' OZ-IN)  AT BLADE # ',
     !I3,'(',F7.3,' DEG.',')',//,'MAX VIB = ',F6.3,' MILS IN',
     @' ( ',I4,' RPM  TO ',I4,' RPM)',
     */'MAX VIB = ',F6.3,' MILS IN ALL SPEED RANGE AT ',
     &I4,' RPM',/)
9274 FORMAT(' LPT CORRECTIVE WEIGHT = ',F5.2,' OZ-IN)  AT BLADE # ',
     !I3,'(',F7.3,' DEG.',')',//,' MAX VIB = ',F6.3,' MILS IN',
     @' ( ',I4,' RPM  TO ',I4,' RPM)',
     */' MAX VIB = ',F6.3,' MILS IN ALL SPEED RANGE AT ',
     &I4,' RPM',/)

673 CONTINUE

IF(ISPEED.EQ.1.AND.IOPT.NE.1)WRITE(4,1014)WTF,P2
     IF(ISPEED.EQ.2.AND.IOPT.NE.1)WRITE(4,2014)WTF,P2
C1**********
     IF(ISPEED.EQ.1.AND.IOPT.EQ.1)WRITE(4,1814)ALIMIT,WTF,P2
     IF(ISPEED.EQ.2.AND.IOPT.EQ.1)WRITE(4,2814)ALIMIT,WTF,P2

1814 FORMAT('$LPT CORRECTIVE WEIGHT ONLY RESPONSES WITH A-FLANGE',
     #' LIMIT = ',F6.3,' MILS',/'$FAN CORRECTIVE WEIGHT = ',F5.2,
     *' (OZ-IN)',2X,'PHASE = ',F7.3,' (DEGREE)',/'FAN',/'FREQ.  ',
     ^'A-AFLNG  P-AFLNG  A-PFLNG  P-PFLNG')

2814 FORMAT('$LPT CORRECTIVE WEIGHT ONLY RESPONSES WITH A-FLANGE',
     #' LIMIT = ',F6.3,' MILS',/'$FAN CORRECTIVE WEIGHT = ',F5.2,
     *' (OZ-IN)',2X,'PHASE = ',F7.3,' (DEGREE)',/'FAN',/'SPEED  ',
     ^'A-AFLNG  P-AFLNG  A-PFLNG  P-PFLNG')

C2**********

DO 129 J=1,NFR
 129 WRITE(4,90)FREQ2(J),(RA(I,J),PA(I,J),I=1,NMV)
     WRITE(4,1012)
1014 FORMAT('$LPT CORRECTIVE WEIGHT ONLY RESPONSES',/
     #'$LPT CORRECTIVE WEIGHT = ',F5.2,' (OZ-IN)',2X,'PHASE = ',
     *F7.3,' (DEGREE)',/'LPT',/'FREQ.  A-AFLNG  P-AFLNG',
     ^'  A-PFLNG  P-PFLNG')
2014 FORMAT('$LPT CORRECTIVE WEIGHT ONLY RESPONSES',/
     #'$LPT CORRECTIVE WEIGHT = ',F5.2,' (OZ-IN)',2X,'PHASE = ',
     *F7.3,' (DEGREE)',/'LPT',/'SPEED  A-AFLNG  P-AFLNG',
     ^'  A-PFLNG  P-PFLNG')

IF(DEAR.EQ.'N'.OR.DEAR.EQ.'n')GOTO 6002
     IF(ISPEED.EQ.1)CALL FORM1(NFR,NMV,RA,FREQ1)
     IF(ISPEED.EQ.2)CALL FORM3(NFR,NMV,RA,IFREQ)
6002 CONTINUE

IF(ISPEED.EQ.1)CALL FORM2(NFR,NMV,RA,FREQ1)
     IF(ISPEED.EQ.2)CALL FORM4(NFR,NMV,RA,IFREQ)

WRITE(6,1440)
     WRITE(3,1440)

GOTO 1400
1800 CONTINUE
     RBEST=VMAX
```

```
          NWT=15
          DAWT=4.3
          WT=0.
          KTN=0
C1**********
          RACL=1.E+8
          KOPT=0
          KR=0
C2*********
          DO 3000 L=1,NWT
          WT=WT+DAWT
          IF(KTN.EQ.1)GOTO 13
          DP=90.
          N=0
   11     N=N+1
C1************
          IF(N.GT.5.AND.IOPT.EQ.1)GOTO 971
          GOTO 972
  971     CONTINUE
          IF(L.EQ.10)GOTO 973
          GOTO 3000
  973     CONTINUE
c         WRITE(6,975)RACL
          WRITE(6,1440)
          WRITE(3,1440)
          WRITE(6,8888)
          WRITE(3,8888)

WRITE(6,*)'NO IMPROVEMENT WITH LPT WEIGHT ONLY'
          WRITE(3,575)
  575     FORMAT('NO IMPROVEMENT WITH LPT WEIGHT ONLY')

WRITE(6,8888)
          WRITE(3,8888)
          WRITE(6,1440)
          WRITE(3,1440)

c 975     FORMAT(/,'FOR LPT CORRECTIVE WEIGHT ONLY ',//,
c        *'MAX A-FLANGE VIB. CAN NOT BE < ~ ',F6.3,' MILS',/)
          WRITE(6,1440)
          GOTO 1900
  972     CONTINUE
C2************
          IF(N.GT.5)GOTO 1205
          PH=-90./(2.**(N-1))
          IF(N.EQ.3)PH=-67.5
          IF(N.EQ.4)PH=-22.5
          KR=0
          K=0
   12     K=K+1
          IF(K.GT.4.AND.KR.EQ.1)GOTO 13
          IF(K.GT.4)GOTO 11
          PH=PH+DP
          APH=PH*PI/180.
          WTA=CMPLX(WT*COS(APH),WT*SIN(APH))

C1******
          CALL RLPT(A0N,RLV,WTA,R,RAC)
          IF(IOPT.EQ.1.AND.RAC.GT.ALIMIT)GOTO 15
C1******
          KOPT=KOPT+1
          IF(IOPT.EQ.1.AND.KOPT.EQ.1)RBEST=R
          IF(IOPT.EQ.1.AND.KOPT.EQ.1)P1=PH
          IF(IOPT.EQ.1.AND.KOPT.EQ.1)KR=1
```

```
        IF(R.LT.RBEST)KR=1
        IF(R.LT.RBEST)P1=PH
        IF(R.LT.RBEST)RBEST=R
 15     CONTINUE
        IF(RAC.LT.RACL)RACL=RAC
C2******* c       WRITE(6,*)'R,RBEST,WT,PH,RAC,0'
c       WRITE(6,*)R,RBEST,WT,PH,RAC

GOTO 12
 13     CONTINUE
        IF(KTN.EQ.1)DP=45.
        IF(KTN.EQ.1)P1=P2
        KTN=1
        KTNP=1
        KD=0
        DO 14 I1=N,5
        DP=90./(2.**I1)
        PH=P1-DP
        APH=PH*PI/180.
        WTA=CMPLX(WT*COS(APH),WT*SIN(APH))
C1*********
        CALL RLPT(A0N,RLV,WTA,R,RAC)
        IF(IOPT.EQ.1.AND.RAC.GT.ALIMIT)GOTO 16

IF(R.LT.RBEST)KD=1
        IF(R.LT.RBEST)WTF=WT
        IF(R.LT.RBEST)P2=PH
        IF(R.LT.RBEST)RBEST=R
 16     CONTINUE
C2************
c       WRITE(6,*)'R,RBEST,WT,PH,P2,RAC,ALIMIT,1'
c       WRITE(6,*)R,RBEST,WT,PH,P2,RAC,ALIMIT
        PH=P1+DP
        APH=PH*PI/180.
        WTA=CMPLX(WT*COS(APH),WT*SIN(APH))
C1**********
        CALL RLPT(A0N,RLV,WTA,R,RAC)
        IF(IOPT.EQ.1.AND.RAC.GT.ALIMIT)GOTO 17

IF(R.LT.RBEST)WTF=WT
        IF(R.LT.RBEST)KD=1
        IF(R.LT.RBEST)P2=PH
        IF(R.LT.RBEST)RBEST=R
 17     CONTINUE
C2**********
c       WRITE(6,*)'R,RBEST,WT,PH,P2,RAC,ALIMIT,2'
c       WRITE(6,*)R,RBEST,WT,PH,P2,RAC,ALIMIT
        IF(KD.EQ.1)P1=P2
 14     CONTINUE
        IF(KD.EQ.0.AND.L.GT.1)GOTO 1205
        IF(KD.EQ.0)GOTO 3001

GOTO 3000
 3001   P2=P1
        WTF=WT

3000   CONTINUE
        GOTO 1400

1500   CONTINUE
        NWT=15
        DAWT=4.3
        WT=0.
        KTN=0
        KTNP=0
```

```
      DO 2000 L=1,NWT
      WT=WT+DAWT
      IF(KTN.EQ.1)GOTO 3
      DP=90.
      N=0
    1 N=N+1
      IF(N.GE.9)GOTO 2000
      PH=-90./(2.**(N-1))
      IF(N.EQ.3)PH=-67.5
      IF(N.EQ.4)PH=-22.5
      IF(N.EQ.5)PH=-78.75
      IF(N.EQ.6)PH=-56.25
      IF(N.EQ.7)PH=-33.75
      IF(N.EQ.8)PH=-11.25
      KR=0
      K=0
    2 K=K+1
c     WRITE(6,*)'N,PH,K,KR,RBEST,R'
c     WRITE(6,*)N,PH,K,KR,RBEST,R
      IF(K.GT.4.AND.KR.EQ.1)GOTO 3
      IF(K.GT.4)GOTO 1
      PH=PH+DP
      APH=PH*PI/180.
      WTA=CMPLX(WT*COS(APH),WT*SIN(APH))
      CALL PLIMIT(NCOUNT,RESP,NO,NLOW,A0,A0N,RLV,WTA)
      IF(KBEST.EQ.1)GOTO 2
      CALL WEIGHT(NCOUNT,RESP,NO,NLOW,PMAX,PMIN,NWMAX,NWMIN)
      IF(KBEST.EQ.1)GOTO 2
      CALL RSPN(NWMAX,NWMIN,PMAX,PMIN,R,WGHT,PHASE,A0N,WTA,RFV,RLV)
      IF(R.LT.RBEST)KR=1
c     WRITE(6,*)'RBEST,R,P1,PH,WGHT,PHASE'
c     WRITE(6,*)RBEST,R,P1,PH,WGHT,PHASE
      IF(R.LT.RBEST)P1=PH
      IF(R.LT.RBEST)WTF=WT
      IF(R.LT.RBEST)PTF=PH
      IF(R.LT.RBEST)WG=WGHT
      IF(R.LT.RBEST)PPHAS=PHASE
      IF(R.LT.RBEST)RBEST=R
      GOTO 2
    3 CONTINUE
      KD=1
      IF(KTN.EQ.1)KD=0
      IF(KTN.EQ.1)DP=45.
      KTN=1
      KTNP=1
      P2=P1
      DO 4 I1=1,5
      P1=P2
      DP=90./(2.**I1)
      PH=P1-DP
      APH=PH*PI/180.
c     WRITE(6,*)'WT,PH,RBEST,1'
c     WRITE(6,*)WT,PH,RBEST
      WTA=CMPLX(WT*COS(APH),WT*SIN(APH))
      CALL PLIMIT(NCOUNT,RESP,NO,NLOW,A0,A0N,RLV,WTA)
      IF(KBEST.EQ.1)GOTO 9000
      CALL WEIGHT(NCOUNT,RESP,NO,NLOW,PMAX,PMIN,NWMAX,NWMIN)
      IF(KBEST.EQ.1)GOTO 9000
      CALL RSPN(NWMAX,NWMIN,PMAX,PMIN,R,WGHT,PHASE,A0N,WTA,RFV,RLV)
      IF(R.LT.RBEST)P2=PH
      IF(R.LT.RBEST)WTF=WT
      IF(R.LT.RBEST)PTF=PH
      IF(R.LT.RBEST)WG=WGHT
      IF(R.LT.RBEST)PPHAS=PHASE
      IF(R.LT.RBEST)KD=1
      IF(R.LT.RBEST)RBEST=R
c     WRITE(6,*)'RBEST,R,PH,P1,P2,WGHT,PHASE,1'
```

```
c       WRITE(6,*)RBEST,R,PH,P1,P2,WGHT,PHASE
 9000   CONTINUE
        PH=P1+DP
        APH=PH*PI/180.
c         WRITE(6,*)'WT,PH,RBEST,2'
c         WRITE(6,*)WT,PH,RBEST

WTA=CMPLX(WT*COS(APH),WT*SIN(APH))
        CALL PLIMIT(NCOUNT,RESP,NO,NLOW,A0,A0N,RLV,WTA)
        IF(KBEST.EQ.1)GOTO 4
        CALL WEIGHT(NCOUNT,RESP,NO,NLOW,PMAX,PMIN,NWMAX,NWMIN)
        IF(KBEST.EQ.1)GOTO 4 c         WRITE(6,*)'KBEST,NCOUNT,NLOW,RESP'
c         WRITE(6,*)KBEST,NCOUNT(NO),NLOW(NO),RESP(NO)

CALL RSPN(NWMAX,NWMIN,PMAX,PMIN,R,WGHT,PHASE,A0N,WTA,RFV,RLV)
        IF(R.LT.RBEST)P2=PH
        IF(R.LT.RBEST)WTF=WT
        IF(R.LT.RBEST)PTF=PH
        IF(R.LT.RBEST)WG=WGHT
        IF(R.LT.RBEST)PPHAS=PHASE
        IF(R.LT.RBEST)KD=1
        IF(R.LT.RBEST)RBEST=R
c         WRITE(6,*)'RBEST,R,PH,P1,P2,WGHT,PHASE,2'
c         WRITE(6,*)RBEST,R,PH,P1,P2,WGHT,PHASE

4      CONTINUE
        IF(KD.EQ.0)GOTO 2002
        GOTO 2000
 2001   KTN=0
        IF(KTNP.EQ.1)GOTO 2002
        GOTO 2013
 2000   CONTINUE
        GOTO 2013
C************************************************
C       FAN UNBALANCE 1ST + LPT UNBALANCE   IN ALL OPERATING FREQUENCY
C************************************************
 2002   WGHT=WG
        PHASE=PPHAS
        IF(PHASE.GT.360.)PHASE=PHASE-360.
        IF(PHASE.LT.0.)PHASE=PHASE+360.
        PHASE=PHASE+0.0001
        NBLADE=(PHASE/PHID)+1
        PH=360./128.
        IF(PTF.GT.360.)PTF=PTF-360.
        IF(PTF.LT.0.)PTF=PTF+360.
        PTF=PTF+.0001
        NBL=(PTF/PH)+1
C1****************
        IF(IOPTS.EQ.1)CALL RMAXAP(A0N,RLV,RFV,PHASE,WGHT,PTF,WTF)
        IF(IOPTS.EQ.1)GOTO 1900
C2****************
        IF(IOPT.EQ.1)GOTO 677

IF(ISPEED.EQ.1)WRITE(6,8264)WGHT,NBLADE,PHASE,WTF,NBL,PTF,RBEST,
       +FREQ2(NF1),FREQ2(NF2)
        IF(ISPEED.EQ.1)WRITE(3,1264)WGHT,NBLADE,PHASE,WTF,NBL,PTF,RBEST,
       +FREQ2(NF1),+FREQ2(NF2)
        IF(ISPEED.EQ.2)WRITE(6,9264)WGHT,NBLADE,PHASE,WTF,NBL,PTF,RBEST,
       +IFREQ(NF1),IFREQ(NF2)
        IF(ISPEED.EQ.2)WRITE(3,2264)WGHT,NBLADE,PHASE,WTF,NBL,PTF,RBEST,
       +IFREQ(NF1),+IFREQ(NF2)
C1**********
```

```
677 CONTINUE
    CALL RMAX(AON,RLV,RFV,PHASE,WGHT,PTF,WTF,RTOP,FRM,FREQ2,RA,PA,
   *RTOPP,FRMP)
    IF(IOPT.EQ.1)GOTO 678
    GOTO 679
678 CALL RNEW(AON,RLV,RFV,PHASE,WGHT,PTF,WTF,NBLADE,NBL,ISPEED,
   *FREQ1,FREQ2,IFREQ)
    GOTO 680
679 CONTINUE
C2********

1264 FORMAT('FAN CORRECTIVE WEIGHT = ',F5.2,'(OZ-IN)  AT BLADE # ',I2,
    #'(',F7.3,' DEG.)    PLUS ',/,'LPT CORRECTIVE WEIGHT = ',F5.2,
    @'(OZ-IN)  ','AT BLADE # ',I3,'(',F7.3,' DEG.)',//'MAX VIB = ',
    &F6.3,' MILS IN  ( ',F7.3,' HZ   TO ',F7.3,' HZ) ')
8264 FORMAT(' FAN CORRECTIVE WEIGHT = ',F5.2,'(OZ-IN)- AT BLADE # ',I2,
    #'(',F7.3,' DEG.)    PLUS ',/,' LPT CORRECTIVE WEIGHT = ',F5.2,
    @'(OZ-IN)  ','AT BLADE # ',I3,'(',F7.3,' DEG.)',//' MAX VIB = ',
    &F6.3,' MILS IN  ( ',F7.3,' HZ   TO ',F7.3,' HZ) ')

2264 FORMAT('FAN CORRECTIVE WEIGHT = ',F5.2,'(OZ-IN)  AT BLADE # ',I2,
    #'(',F7.3,' DEG.)    PLUS ',/,'LPT CORRECTIVE WEIGHT = ',F5.2,
    @'(OZ-IN)  ','AT BLADE # ',I3,'(',F7.3,' DEG.)',//'MAX VIB = ',
    &F6.3,' MILS IN  ( ',I4,' RPM TO ',I4,' RPM) ')
9264 FORMAT(' FAN CORRECTIVE WEIGHT = ',F5.2,'(OZ-IN)  AT BLADE # ',I2,
    #'(',F7.3,' DEG.)    PLUS ',/,' LPT CORRECTIVE WEIGHT = ',F5.2,
    @'(OZ-IN)  ','AT BLADE # ',I3,'(',F7.3,' DEG.)',//' MAX VIB = ',
    &F6.3,' MILS IN  ( ',I4,' RPM TO ',I4,' RPM) ')

IF(ISPEED.EQ.1)WRITE(6,8265)RTOP,FRM
    IF(ISPEED.EQ.1)WRITE(3,1265)RTOP,FRM
    IFRM=FRM
    IF(ISPEED.EQ.2)WRITE(6,9265)RTOP,IFRM
    IF(ISPEED.EQ.2)WRITE(3,2265)RTOP,IFRM

1265 FORMAT('MAX VIB = ',F6.3,' MILS IN ALL FREQUENCY RANGE AT ',
    %F7.3,' HZ',/)
8265 FORMAT(' MAX VIB = ',F6.3,' MILS IN ALL FREQUENCY RANGE AT ',
    %F7.3,' HZ',/)

2265 FORMAT('MAX VIB = ',F6.3,' MILS IN ALL SPEED RANGE AT ',
    %I4,' RPM',/)
9265 FORMAT(' MAX VIB = ',F6.3,' MILS IN ALL SPEED RANGE AT ',
    %I4,' RPM',/)

C1******
680 CONTINUE
C2******

IF(ISPEED.EQ.1.AND.IOPT.NE.1)WRITE(4,1015)WGHT,PHASE,WTF,PTF
    IF(ISPEED.EQ.2.AND.IOPT.NE.1)WRITE(4,2015)WGHT,PHASE,WTF,PTF
C1*******
    IF(ISPEED.EQ.1.AND.IOPT.EQ.1)WRITE(4,1815)ALIMIT,WGHT,PHASE,WTF,PTF
    IF(ISPEED.EQ.2.AND.IOPT.EQ.1)WRITE(4,2815)ALIMIT,WGHT,PHASE,WTF,PTF

1815 FORMAT('$FAN AND LPT CORRECTIVE WEIGHTS RESPONSES WITH ',
    !'A-FLANGE LIMIT = ',F6.3,' MILS',/
    #'$FAN CORRECTIVE WEIGHT = ',F5.2,' (OZ-IN)',2X,'PHASE = ',
    *F7.3,' (DEGREE)',/'$LPT CORRECTIVE WEIGHT =',F5.2,' (OZ-IN)',
    $2X,'PHASE = ',F7.3,' (DEGREE)',//'FANLPT',/,
    &'FREQ. A-AFLNG P-AFLNG A-PFLNG P-PFLNG')
```

```
 2815 FORMAT('$FAN AND LPT CORRECTIVE WEIGHTS RESPONSES WITH ',
     !'A-FLANGE LIMIT = ',F6.3,' MILS',/
     #'$FAN CORRECTIVE WEIGHT = ',F5.2,' (OZ-IN)',2X,'PHASE = ',
     *F7.3,' (DEGREE)',/'$LPT CORRECTIVE WEIGHT = ',F5.2,' (OZ-IN)',
     $2X,'PHASE = ',F7.3,' (DEGREE)',/'FANLPT',/,
     &'SPEED   A-AFLNG  P-AFLNG  A-PFLNG  P-PFLNG')
C2********
      DO 139 J=1,NFR
  139 WRITE(4,90)FREQ2(J),(RA(I,J),PA(I,J),I=1,NMV)
      WRITE(4,1012)
 1015 FORMAT('$FAN AND LPT CORRECTIVE WEIGHTS RESPONSES',/
     #'$FAN CORRECTIVE WEIGHT = ',F5.2,' (OZ-IN)',2X,'PHASE = ',
     *F7.3,' (DEGREE)',/'$LPT CORRECTIVE WEIGHT =',F5.2,' (OZ-IN)',
     $2X,'PHASE = ',F7.3,' (DEGREE)',/'FANLPT',/,
     &'FREQ.   A-AFLNG  P-AFLNG  A-PFLNG  P-PFLNG')

2015 FORMAT('$FAN AND LPT CORRECTIVE WEIGHTS RESPONSES',/
     #'$FAN CORRECTIVE WEIGHT = ',F5.2,' (OZ-IN)',2X,'PHASE = ',
     *F7.3,' (DEGREE)',/'$LPT CORRECTIVE WEIGHT = ',F5.2,' (OZ-IN)',
     $2X,'PHASE = ',F7.3,' (DEGREE)',/'FANLPT',/,
     &'SPEED   A-AFLNG  P-AFLNG  A-PFLNG  P-PFLNG')
      IF(DEAR.EQ.'N'.OR.DEAR.EQ.'n')GOTO 6003

IF(ISPEED.EQ.1)CALL FORM1(NFR,NMV,RA,FREQ1)
      IF(ISPEED.EQ.2)CALL FORM3(NFR,NMV,RA,IFREQ)
 6003 CONTINUE

IF(ISPEED.EQ.1)CALL FORM2(NFR,NMV,RA,FREQ1)
      IF(ISPEED.EQ.2)CALL FORM4(NFR,NMV,RA,IFREQ)

WRITE(6,1440)
      WRITE(3,1440)

GOTO 1400

2013 CONTINUE
      WRITE(6,1440)
      WRITE(3,1440)
      WRITE(6,8888)
      WRITE(3,8888)

WRITE(6,*)'NO IMPROVEMENT WITH COMBINATION WEIGHT'
      WRITE(3,576)
  576 FORMAT('NO IMPROVEMENT WITH COMBINATION WEIGHT')
      WRITE(6,8888)
      WRITE(3,8888)
      WRITE(6,1440)
      WRITE(3,1440)

1400 CONTINUE
 1900 CONTINUE

C1****************
      IF(IOPTS.EQ.1)IOPTSR=1
      IF(IOPTS.EQ.1)GOTO 876
C2****************

WRITE(6,*)' '
      DO 777 IS=1,100
      WRITE(*,*)'INPUT SELECTED WEIGHTS ( FAN PHASE  LPT PHASE )'
      READ(*,*)WGHT,PHASE,WTF,PTF
      WRITE(3,2010)IS,WGHT,PHASE,WTF,PTF
      WRITE(6,9010)IS,WGHT,PHASE,WTF,PTF
```

```
      KG=3
2010 FORMAT('ENGINE RESPONSE WITH  NO.',I2,' SELECTION OF ',
    *'CORRECTIVE WEIGHTS',/'FAN WEIGHT = ',F5.2,' (OZ-IN) ',
    $' PHASE = ',F8.3,' (DEGREE)',/,'LPT WEIGHT = ',F5.2,
    %' (OZ-IN) ',' PHASE = ',F8.3,' (DEGREE)',/)
9010 FORMAT(' ENGINE RESPONSE WITH  NO.',I2,' SELECTION OF ',
    *'CORRECTIVE WEIGHTS',/' FAN WEIGHT = ',F5.2,' (OZ-IN) ',
    $' PHASE = ',F8.3,' (DEGREE)',/,' LPT WEIGHT = ',F5.2,
    %' (OZ-IN) ',' PHASE = ',F8.3,' (DEGREE)',/)

CALL RMAX(AON,RLV,RFV,PHASE,WGHT,PTF,WTF,RTOP,FRM,FREQ2,
    *RA,PA,RTOPP,FRMP)

IF(IOPT.EQ.1)GOTO 801

IF(ISPEED.EQ.1)WRITE(6,8265)RTOP,FRM
      IF(ISPEED.EQ.1)WRITE(3,1265)RTOP,FRM
      IFRM=FRM
      IF(ISPEED.EQ.2)WRITE(6,9265)RTOP,IFRM
      IF(ISPEED.EQ.2)WRITE(3,2265)RTOP,IFRM
C1****************
      GOTO 802
 801  CONTINUE
      IF(ISPEED.EQ.1)WRITE(6,8266)RTOPP,FRMP
      IF(ISPEED.EQ.1)WRITE(3,1266)RTOPP,FRMP
      IFRMP=FRMP
      IF(ISPEED.EQ.2)WRITE(6,9266)RTOPP,IFRMP
      IF(ISPEED.EQ.2)WRITE(3,2266)RTOPP,IFRMP
 802  CONTINUE

1266 FORMAT('MAX P-FLANGE VIB = ',F6.3,' MILS IN ALL FREQUENCY ',
    *'RANGE AT ',F7.3,' HZ',/)
8266 FORMAT(' MAX P-FLANGE VIB = ',F6.3,' MILS IN ALL FREQUENCY ',
    *'RANGE AT ',F7.3,' HZ',/)

2266 FORMAT('MAX P-FLANGE VIB = ',F6.3,' MILS IN ALL SPEED ',
    *'RANGE AT ',I4,' RPM',/)
9266 FORMAT(' MAX P-FLANGE VIB = ',F6.3,' MILS IN ALL SPEED ',
    *'RANGE AT ',I4,' RPM',/)

C2**************

IF(DEAR.EQ.'N'.OR.DEAR.EQ.'n')GOTO 6004
      IF(ISPEED.EQ.1)CALL FORM1(NFR,NMV,RA,FREQ1)
      IF(ISPEED.EQ.2)CALL FORM3(NFR,NMV,RA,IFREQ)
 6004 CONTINUE

IF(ISPEED.EQ.1)CALL FORM2(NFR,NMV,RA,FREQ1)
      IF(ISPEED.EQ.2)CALL FORM4(NFR,NMV,RA,IFREQ)

IF(ISPEED.EQ.1)WRITE(4,1016)IS,WGHT,PHASE,WTF,PTF,IS
      IF(ISPEED.EQ.2)WRITE(4,2016)IS,WGHT,PHASE,WTF,PTF,IS

DO 149 J=1,NFR
 149  WRITE(4,90)FREQ2(J),(RA(I,J),PA(I,J),I=1,NMV)
      WRITE(4,1012)

1016 FORMAT('$ ENGINE RESPONSE WITH NO.',I2,'   SELECTION OF',
    #' CORRECTIVE WEIGHTS',/'$FAN CORRECTIVE WEIGHT = ',F5.2,
    *' (OZ-IN)',2X,'PHASE = ',F8.3,' (DEGREE)',/'$LPT CORREC',
    $'TIVE WEIGHT =',F5.2,' (OZ-IN)',2X,'PHASE = ',F8.3,
    &' (DEGREE)',/'SELCT',I1,/,'FREQ.  A-AFLNG  P-AFLNG   ',
    !'A-PFLNG  P-PFLNG')
```

```
2016 FORMAT('$ ENGINE RESPONSE WITH NO.',I2,' SELECTION OF',
    #' CORRECTIVE WEIGHTS',/'$FAN CORRECTIVE WEIGHT = ',F5.2,
    *' (OZ-IN)',2X,'PHASE = ',F8.3,' (DEGREE)',/'$LPT CORREC',
    $'TIVE WEIGHT =',F5.2,' (OZ-IN)',2X,'PHASE = ',F8.3,
    &' (DEGREE)',/'SELCT',I1,/,'SPEED  A-AFLNG  P-AFLNG  ',
    !'A-PFLNG  P-PFLNG')

WRITE(*,*)'DO YOU WANT TO SELECT MORE WEIGHTS ? (Y/N)'
      READ(*,10)SEL
      IF(SEL.EQ.'Y'.OR.SEL.EQ.'y')WRITE(3,1440)
      IF(SEL.EQ.'Y'.OR.SEL.EQ.'y')GOTO 777
      GOTO 666
777   CONTINUE
666   CONTINUE

STOP
      END
      SUBROUTINE PLIMIT(NCOUNT,RESP,NO,NLOW,A0,A0N,RLV,WTA)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX A0(2,20),A0N(2,20),RLV(2,20),WTA
      DIMENSION RINFL(2,20),PINFL(2,20),NCOUNT(20),RESP(20),NLOW(20)
      RL1=VMAX-0.01
      NO=0
      KBEST=0
      IF(KG.EQ.3)RL1=RBEST-0.01
      DRL1=-1.
      DO 10 J=NF1,NF2
      DO 10 I=1,NMV
      IF(KG.EQ.3)A0(I,J)=A0N(I,J)+RLV(I,J)*WTA
      RINFL(I,J)=AFI(I,J)
      PINFL(I,J)=PFI(I,J)
      IF(KG.EQ.2)RINFL(I,J)=ALI(I,J)
      IF(KG.EQ.2)PINFL(I,J)=PLI(I,J)
      AML0(I,J)=SQRT((REAL(A0N(I,J)))**2+(AIMAG(A0N(I,J)))**2)
      PML0(I,J)=ATAN2(AIMAG(A0N(I,J)),REAL(A0N(I,J)))
      IF(KG.EQ.3)AML0(I,J)=SQRT((REAL(A0(I,J)))**2+(AIMAG(A0(I,J)))**2)
      IF(KG.EQ.3)PML0(I,J)=ATAN2(AIMAG(A0(I,J)),REAL(A0(I,J)))
10    CONTINUE

1000  NCONT=0
      PHILOW=-1.E+6
      PHIHI=1.E+6
      KNUM=0
      DO 11 J=NF1,NF2
      DO 12 I=1,NMV
      H1=AML0(I,J)/RINFL(I,J)
      H2=RL1/RINFL(I,J)
C1*******
      IF(IOPT.EQ.1.AND.I.EQ.1)H2=ALIMIT/RINFL(I,J)
C2*******
      IF(H1.LT.H2)GOTO 12
      NCONT=NCONT+1
      H3=SQRT(H1**2-H2**2)
      PHAS=ATAN2(H2,H3)
      PHI1=(-PINFL(I,J)+PML0(I,J)-PHAS)*180./PI+180.
      PHI2=(-PINFL(I,J)+PML0(I,J)+PHAS)*180./PI+180.
      NPHI1=PHI1/360.
      NPHI2=PHI2/360.
      PHI1=PHI1-(360.*NPHI1)
      PHI2=PHI2-(360.*NPHI2)
      IF(PHI1.LT.0.)PHI1=360.+PHI1
```

```
        IF(PHI2.LT.0.)PHI2=360.+PHI2
        PMAX=PHI1
        IF(PHI2.GT.PMAX)PMAX=PHI2
        PMIN=PHI1
        IF(PHI2.LT.PMIN)PMIN=PHI2
C         WRITE(6,*)'PMAX,PMIN,RL1,RBEST'
C         WRITE(6,*)PMAX,PMIN,RL1,RBEST

IF((PMAX-PMIN).GT.180.)GOTO 1
        GOTO 3
   1    PA=PMAX
        PMAX=PMIN+360.
        PMIN=PA
   3    IF(PHIHI.GT.360..AND.PMIN.LT.180.)GOTO 7
        GOTO 8
   7    PMIN=PMIN+360.
        PMAX=PMAX+360.
   8    CONTINUE

IF(PMIN.GT.PHILOW)PHILOW=PMIN
        IF(PMAX.LT.PHIHI)PHIHI=PMAX

IF(PHIHI.GT.360..AND.PHILOW.GT.360.)GOTO 4
        GOTO 5
   4    PHIHI=PHIHI-360.
        PHILOW=PHILOW-360.
   5    CONTINUE
C         WRITE(6,*)'PHILOW,PHIHI,RL1,RBEST'
C         WRITE(6,*)PHILOW,PHIHI,RL1,RBEST

IF(PHILOW.GT.PHIHI.AND.KG.EQ.3)GOTO 709
        IF(PHILOW.GT.PHIHI)GOTO 708
  12    CONTINUE
  11    CONTINUE
        IF(NCONT.EQ.0)GOTO 711
        NL=PHILOW/PHID
        NHI=PHIHI/PHID
        NC=NHI-NL
        NO=NO+1
        RESP(NO)=RL1
        NLOW(NO)=NL
        NCOUNT(NO)=NC
        IF(NC.EQ.0.AND.KG.EQ.3)GOTO 709
        IF(KG.EQ.3)GOTO 1001
        IF(NC.EQ.0)GOTO 708
        IF(ABS(DRL1).LT.0.1)GOTO 1001
        IF(NC.LE.50)GOTO 1001
  711   RL1=RL1+DRL1
        IF(ABS(DRL1).LT.0.1)GOTO 1001
        GOTO 1000
  708   RL1=RL1-(DRL1/2.)
        IF(KG.EQ.1.AND.IOPT.EQ.1)GOTO 1001
        DRL1=DRL1/2.
        GOTO 1000
  709   KBEST=1

1001   RETURN
        END
        SUBROUTINE WEIGHT(NCOUNT,RESP,NO,NLOW,PMAX,PMIN,NWMAX,NWMIN)
        COMMON/A1/AFI(2,20),PFI(2,20),ALI(2,20),PLI(2,20),AML0(2,20),
       #PML0(2,20),PHID,NF1,NF2,NMV,KG,KGC,PI,VMAX,DWT,RBEST,KBEST,NFR,
       @IOPT,ALIMIT

DIMENSION NLOW(20),NCOUNT(20),RESP(20)
        KBEST=0
        WMAX=0.
```

```
            WMIN=1.E+8
            PMAX=0.
            PMIN=1.E+8
            NC=0
    102     PHI=PHID*NLOW(NO)
            DO 20 L=1,NCOUNT(NO)
            RL1=RESP(NO)
            PHI=PHI+PHID
            FLMAX=1.E+8
            FLMIN=0.
            FDMIN=1.E+8
            DO 10 J=NF1,NF2
            DO 10 M=1,NMV
            IF(KG.EQ.1.OR.KG.EQ.3)R1=AFI(M,J)
            IF(KG.EQ.2)R1=ALI(M,J)
            P=PML0(M,J)*180./PI
            IF(KG.EQ.1.OR.KG.EQ.3)P1=PFI(M,J)*180./PI
            IF(KG.EQ.2)P1=PLI(M,J)*180./PI
            ANGLE=(P1-P+PHI)*PI/180.
            ANG=ANGLE*180./PI
            AM=AML0(M,J)
            B=2.*AM*COS(ANGLE)
            C=(AM**2)-(RL1**2)
C1*******
            IF(IOPT.EQ.1.AND.M.EQ.1)C=(AM**2)-(ALIMIT**2)
C2*******
            DELTA=(B**2)-(4.*C)
            D1=(-B+SQRT(DELTA))/(2.*R1)
            D2=(-B-SQRT(DELTA))/(2.*R1)
            IF(C.LT.0.)GOTO 1
            GOTO 2
    1       D=D1
            IF(D.LT.0.)D=D2
            IF(D.LT.FDMIN)FDMIN=D
            GOTO 10
    2       FLLOW=D1
            IF(D2.LT.FLLOW)FLLOW=D2
            FLHI=D1
            IF(D2.GT.FLHI)FLHI=D2
            IF(FLHI.LT.FLMAX)FLMAX=FLHI
            IF(FLLOW.GT.FLMIN)FLMIN=FLLOW
    10      CONTINUE
C           WRITE(6,*)'FDMIN,FLMIN,FLMAX'
C           WRITE(6,*)FDMIN,FLMIN,FLMAX
            IF(FLMIN.GT.FLMAX)GOTO 20
            IF(FDMIN.LT.FLMIN)GOTO 20
            IF(FDMIN.LT.FLMAX)FLMAX=FDMIN
    100     NC=NC+1
            IF(WMAX.LT.FLMAX)WMAX=FLMAX
            IF(WMIN.GT.FLMIN)WMIN=FLMIN
            IF(PHI.LT.PMIN)PMIN=PHI
            IF(PHI.GT.PMAX)PMAX=PHI
C           WRITE(6,*)'WMAX,PMAX,WMIN,PMIN'
C           WRITE(6,*)WMAX,PMAX,WMIN,PMIN
    20      CONTINUE
            IF(NC.EQ.0)GOTO 101
            GOTO 103
    101     NO=NO-1
            IF(NO.EQ.0.AND.KG.EQ.3)GOTO 104
            GOTO 102
    104     KBEST=1
            RETURN
    103     NWMIN=WMIN/DWT
            NWMAX=(WMAX/DWT)+1
            RETURN
            END
            SUBROUTINE RSPN(NWMAX,NWMIN,PMAX,PMIN,R,WGHT,PHASE,AON,WTA,RFV,
```

```
       *RLV)
        COMMON/A1/AFI(2,20),PFI(2,20),ALI(2,20),PLI(2,20),AML0(2,20),
       #PML0(2,20),PHID,NF1,NF2,NMV,KG,KGC,PI,VMAX,DWT,RBEST,KBEST,NFR,
       @IOPT,ALIMIT

COMPLEX WT,RESP,AON(2,20),RFV(2,20),RLV(2,20),WTA
        RSET=1.E+8
        NW=NWMIN-1
        IF(NW.LT.0)NW=0
6666    NW=NW+1
        WTC=NW*DWT
        IF(NW.GT.NWMAX)GOTO 7000
        PHI=PMIN-PHID
5555    PHI=PHI+PHID
        IF(PHI.GT.PMAX)GOTO 6666
        ANG=PHI*PI/180.
        RFINAL=0.
        WT=CMPLX(WTC*COS(ANG),WTC*SIN(ANG))
        DO 5000 J=NF1,NF2
        DO 5000 I=1,NMV
        RESP=AON(I,J)+RFV(I,J)*WT+RLV(I,J)*WTA
        RES=SQRT(REAL(RESP)**2+AIMAG(RESP)**2)

C1********
        IF(IOPT.EQ.1.AND.I.EQ.1)GOTO 5001
        GOTO 5002
 5001   CONTINUE
        IF(RES.GT.ALIMIT)GOTO 5555
        GOTO 5000
 5002   CONTINUE
C2*************
        IF(RES.GT.RSET)GOTO 5555
        IF(RES.GT.RFINAL)RFINAL=RES
 5000   CONTINUE
        IF(RFINAL.LT.RSET)PHASE=PHI
        IF(RFINAL.LT.RSET)WGHT=WTC
        IF(RFINAL.LT.RSET)RSET=RFINAL
        R=RSET
        GOTO 5555

7000   RETURN
        END

SUBROUTINE RLPT(AON,RLV,WTA,R,RAC)
        COMMON/A1/AFI(2,20),PFI(2,20),ALI(2,20),PLI(2,20),AML0(2,20),
       #PML0(2,20),PHID,NF1,NF2,NMV,KG,KGC,PI,VMAX,DWT,RBEST,KBEST,NFR,
       @IOPT,ALIMIT

COMPLEX WTA,AON(2,20),RLV(2,20),RESP

RFINAL=0.
C1********
        RAC=0.
C2********

DO 1 J=NF1,NF2
        DO 1 I=1,NMV
        RESP=AON(I,J)+RLV(I,J)*WTA
        RES=SQRT(REAL(RESP)**2+AIMAG(RESP)**2)
C1********
        IF(IOPT.EQ.1.AND.I.EQ.1)GOTO 2
        GOTO 3
 2      CONTINUE
        IF(RES.GT.RAC)RAC=RES
        GOTO 1
 3      CONTINUE
```

```
C2**********
      IF(RES.GT.RFINAL)RFINAL=RES
1     CONTINUE

R=RFINAL
      RETURN
      END

SUBROUTINE RSPNN(NCOUNT,NO,NLOW,R,WGHT,PHASE,AON,RFV)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX WT,RESP,AON(2,20),RFV(2,20),RLV(2,20)
      DIMENSION NCOUNT(20),NLOW(20)
      RSET=1.E+8
      R=RSET
      PHI=PHID*NLOW(NO)
      DWT=1.
      N1=1
      N2=48
      DO 30 L=1,NCOUNT(NO)
      PHI=PHI+PHID
      DO 20 K=N1,N2
      ANG=PHI*PI/180.
      WTC=K*DWT
      WT=CMPLX(WTC*COS(ANG),WTC*SIN(ANG))
      RFINAL=0.
      DO 5000 J=NF1,NF2
      DO 5000 I=1,NMV
      RESP=AON(I,J)+RFV(I,J)*WT
      RES=SQRT(REAL(RESP)**2+AIMAG(RESP)**2)
C1********
      IF(IOPT.EQ.1.AND.I.EQ.1)GOTO 21
      GOTO 22
21    CONTINUE
      IF(RES.GT.ALIMIT)GOTO 20
22    CONTINUE
C2********
      IF(RES.GT.RSET)GOTO 20
      IF(RES.GT.RFINAL)RFINAL=RES
5000  CONTINUE
      IF(RFINAL.LT.RSET)PHASE=PHI
      IF(RFINAL.LT.RSET)KWT=K
      IF(RFINAL.LT.RSET)RSET=RFINAL
      R=RSET
20    CONTINUE
      N1=KWT-5
      IF(N1.LE.0)N1=1
      N2=KWT+5
30    CONTINUE
      WGHT=DWT*KWT
      RETURN
      END
      SUBROUTINE RMAX(AON,RLV,RFV,PHASE,WGHT,PTF,WTF,RTOP,FRM,FREQ1,RA,
     *PA,RTOPP,FRMP)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX WT1,WT2,AON(2,20),RLV(2,20),RFV(2,20),RESP
      DIMENSION FREQ1(20),RA(2,20),PA(2,20)

RTOP=0.
      RFINAL=0.
```

```
C1********
      RTOPP=0.
      FRMP=0.
C2********
      ANG1=PHASE*PI/180.
      ANG2=PTF*PI/180.
      DO 1 J=1,NFR
      DO 1 I=1,NMV
      WT1=CMPLX(WGHT*COS(ANG1),WGHT*SIN(ANG1))
      WT2=CMPLX(WTF*COS(ANG2),WTF*SIN(ANG2))
      IF(KG.EQ.1)RESP=A0N(I,J)+RFV(I,J)*WT1
      IF(KG.EQ.2)RESP=A0N(I,J)+RLV(I,J)*WT2
      IF(KG.EQ.3)RESP=A0N(I,J)+RFV(I,J)*WT1+RLV(I,J)*WT2
      RES=SQRT(REAL(RESP)**2+AIMAG(RESP)**2)
      RA(I,J)=RES
      PA(I,J)=ATAN2(AIMAG(RESP),REAL(RESP))*180./PI
      IF(PA(I,J).LT.-180.)PA(I,J)=PA(I,J)+360.
      IF(PA(I,J).GT.180.)PA(I,J)=PA(I,J)-360.

C1*************
      IF(IOPT.EQ.1.AND.I.EQ.2)GOTO 2
      GOTO 3
 2    CONTINUE
      IF(RES.GT.RTOPP)FRMP=FREQ1(J)
      IF(RES.GT.RTOPP)RTOPP=RES
 3    CONTINUE
C2************

IF(RES.GT.RFINAL)FRM=FREQ1(J)
      IF(RES.GT.RFINAL)RFINAL=RES
 1    CONTINUE
      RTOP=RFINAL
      RETURN
      END

SUBROUTINE RMAXAP(A0N,RLV,RFV,PHASE,WGHT,PTF,WTF)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX WT1,WT2,A0N(2,20),RLV(2,20),RFV(2,20),RESP
      DIMENSION FREQ1(20),RA(2,20),PA(2,20)

RTOPP=0.
      RFP=0.
C1********
      RTOPA=0.
      RFA=0.
C2********
      ANG1=PHASE*PI/180.
      ANG2=PTF*PI/180.
      DO 1 J=NF1,NF2
      DO 1 I=1,NMV
      WT1=CMPLX(WGHT*COS(ANG1),WGHT*SIN(ANG1))
      WT2=CMPLX(WTF*COS(ANG2),WTF*SIN(ANG2))
      IF(KG.EQ.1)RESP=A0N(I,J)+RFV(I,J)*WT1
      IF(KG.EQ.2)RESP=A0N(I,J)+RLV(I,J)*WT2
      IF(KG.EQ.3)RESP=A0N(I,J)+RFV(I,J)*WT1+RLV(I,J)*WT2
      RES=SQRT(REAL(RESP)**2+AIMAG(RESP)**2)
      RA(I,J)=RES
      PA(I,J)=ATAN2(AIMAG(RESP),REAL(RESP))*180./PI
      IF(PA(I,J).LT.-180.)PA(I,J)=PA(I,J)+360.
      IF(PA(I,J).GT.180.)PA(I,J)=PA(I,J)-360.
```

```
      IF(I.EQ.1.AND.RES.GT.RFA)RFA=RES
      IF(I.EQ.2.AND.RES.GT.RFP)RFP=RES
1     CONTINUE
      RTOPA=RFA
      RTOPP=RFP
      IF(KG.EQ.1)WRITE(6,100)RFA,RFP
      IF(KG.EQ.1)WRITE(3,200)RFA,RFP
      IF(KG.EQ.2)WRITE(6,101)RFA,RFP
      IF(KG.EQ.2)WRITE(3,201)RFA,RFP
      IF(KG.EQ.3)WRITE(6,102)RFA,RFP
      IF(KG.EQ.3)WRITE(3,202)RFA,RFP
100   FORMAT(' FAN WEIGHT ONLY   ',4X,2(6X,F6.3))
101   FORMAT(' LPT WEIGHT ONLY   ',4X,2(6X,F6.3))
102   FORMAT(' FAN & LPT WEIGHTS',4X,2(6X,F6.3))

200   FORMAT('FAN WEIGHT ONLY    ',4X,2(6X,F6.3))
201   FORMAT('LPT WEIGHT ONLY    ',4X,2(6X,F6.3))
202   FORMAT('FAN & LPT WEIGHTS  ',4X,2(6X,F6.3))

RETURN
      END

SUBROUTINE RLPT2(A0N,RLV,WTF,P2,P2NEW,R)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX WTA,A0N(2,20),RLV(2,20),RESP
      R=1.E+8
      DPH=360./128.
      DO 2 K=1,11
      RFINAL=0.
      PHASE=P2+(K-6)*DPH
      ANG=PHASE*PI/180.
      WTA=CMPLX(WTF*COS(ANG),WTF*SIN(ANG))
      DO 1 J=NF1,NF2
      DO 1 I=1,NMV
      RESP=A0N(I,J)+RLV(I,J)*WTA
      RES=SQRT(REAL(RESP)**2+AIMAG(RESP)**2)
C1********
      IF(IOPT.EQ.1.AND.I.EQ.1)GOTO 3
      GOTO 4
3     CONTINUE
      IF(RES.GT.ALIMIT)GOTO 2
      IF(I.EQ.2.AND.RES.GT.RFINAL)RFINAL=RES

GOTO 1
4     CONTINUE

IF(RES.GT.RFINAL)RFINAL=RES
1     CONTINUE
      IF(R.GT.RFINAL)P2NEW=PHASE
      IF(R.GT.RFINAL)R=RFINAL
2     CONTINUE
      RETURN
      END

SUBROUTINE ICS(IC,A0,RFFV,RLLV,KW,TRIAL1,TFAN1,PFAN1,TLPT1,
     *PLPT1,TRIAL2,TFAN2,PFAN2,TLPT2,PLPT2,IUNIT,ISPEED)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT
```

```
      COMPLEX A(2,2),AINV(2,2),B(2),P(2),B0,B1,B2,P0,RLLV(2,20),DET
      COMPLEX P1,P2,FAN1,FAN2,RLPT1,RLPT2,DE,RFFV(2,20),A0(2,20)
      CHARACTER*28 TRIAL1,TRIAL2

ONE=1.
      PI=ACOS(-ONE)

660   WRITE(*,*)'ENTER THE NAME OF THE TRIAL 1 INPUT FILE'
      READ(*,20) TRIAL1
      OPEN(UNIT=1,FILE=TRIAL1,STATUS='OLD')
      READ(1,100)
      READ(1,*)TFAN1,PFAN1,TLPT1,PLPT1
      IF(IC.NE.3)GOTO 550
      WRITE(*,*)'ENTER THE NAME OF THE TRIAL 2 INPUT FILE'
      READ(*,20) TRIAL2
      OPEN(UNIT=5,FILE=TRIAL2,STATUS='OLD')
      READ(5,100)
      READ(5,*)TFAN2,PFAN2,TLPT2,PLPT2

550   CONTINUE

IF(IC.EQ.2)GOTO 551
      GOTO 552

551   IF(TFAN1.NE.0.AND.TLPT1.NE.0.)GOTO 777
      GOTO 778
777   WRITE(*,*)'FAN OR LPT SHOULD BE ZERO ( CHECK TRIAL FILE )'
      GOTO 660
778   CONTINUE

20    FORMAT(A28)

OPEN(UNIT=1,FILE=TRIAL1,STATUS='OLD')

100   FORMAT(1(/))
      IF(TFAN1.EQ.0.)GOTO 751
      PFAN1=PFAN1*PI/180.

FAN1=CMPLX(TFAN1*COS(PFAN1),TFAN1*SIN(PFAN1))
      KW=1
      DO 500 J=1,NFR

READ(1,*)FREQ,BT1A,BT1P,PT1A,PT1P
      IF(ISPEED.EQ.2)FREQ=FREQ/60.
      IF(IUNIT.EQ.1)BT1A=BT1A*9778.5074/(FREQ**2)
      BT1P=BT1P*PI/180.
      IF(IUNIT.EQ.1)PT1A=PT1A*9778.5074/(FREQ**2)
      PT1P=PT1P*PI/180.
      B1=CMPLX(BT1A*COS(BT1P),BT1A*SIN(BT1P))
      P1=CMPLX(PT1A*COS(PT1P),PT1A*SIN(PT1P))

C*****    CALCULATING FAN INFL. CO.    ***********

B(1)=B1-A0(1,J)
      P(1)=P1-A0(2,J)
      RFFV(1,J)=B(1)/FAN1
      RFFV(2,J)=P(1)/FAN1

500   CONTINUE
      GOTO 1111

751   CONTINUE

KW=2
      PLPT1=PLPT11*PI/180.

RLPT1=CMPLX(TLPT1*COS(PLPT1),TLPT1*SIN(PLPT1))
```

```
C************************ STARTING MAIN DO LOOP ********************

DO 501 J=1,NFR

READ(1,*)FREQ,BT1A,BT1P,PT1A,PT1P
      IF(ISPEED.EQ.2)FREQ=FREQ/60.

IF(IUNIT.EQ.1)BT1A=BT1A*9778.5074/(FREQ**2)
      BT1P=BT1P*PI/180.
      IF(IUNIT.EQ.1)PT1A=PT1A*9778.5074/(FREQ**2)
      PT1P=PT1P*PI/180.
      B1=CMPLX(BT1A*COS(BT1P),BT1A*SIN(BT1P))
      P1=CMPLX(PT1A*COS(PT1P),PT1A*SIN(PT1P))

C*****   CALCULATING FAN INFL. CO.   ***********

B(1)=B1-A0(1,J)
      P(1)=P1-A0(2,J)
      RLLV(1,J)=B(1)/RLPT1
      RLLV(2,J)=P(1)/RLPT1
 501  CONTINUE

GOTO 1111

552  CONTINUE
      PFAN1=PFAN1*PI/180.
      PLPT1=PLPT1*PI/180.
      PFAN2=PFAN2*PI/180.
      PLPT2=PLPT2*PI/180.

C**************** CONVERTING THE TRIAL UNBALANCES INTO COMPLEX VECTORS

FAN1=CMPLX(TFAN1*COS(PFAN1),TFAN1*SIN(PFAN1))
      RLPT1=CMPLX(TLPT1*COS(PLPT1),TLPT1*SIN(PLPT1))
      FAN2=CMPLX(TFAN2*COS(PFAN2),TFAN2*SIN(PFAN2))
      RLPT2=CMPLX(TLPT2*COS(PLPT2),TLPT2*SIN(PLPT2))

C *********** ASSIGNING THE A MATRIX THEN INVERTING IT **************

A(1,1)=FAN1
      A(1,2)=RLPT1
      A(2,1)=FAN2
      A(2,2)=RLPT2

DET=A(1,1)*A(2,2)-A(1,2)*A(2,1)

AINV(1,1)=A(2,2)/DET
      AINV(1,2)=-A(1,2)/DET
      AINV(2,1)=-A(2,1)/DET
      AINV(2,2)=A(1,1)/DET

C************************ STARTING MAIN DO LOOP ********************

DO 503 J=1,NFR

READ(1,*)FREQ,BT1A,BT1P,PT1A,PT1P

READ(5,*)FREQ,BT2A,BT2P,PT2A,PT2P
      IF(ISPEED.EQ.2)FREQ=FREQ/60.

IF(IUNIT.EQ.1)BT1A=BT1A*9778.5074/(FREQ**2)
      BT1P=BT1P*PI/180.
      IF(IUNIT.EQ.1)PT1A=PT1A*9778.5074/(FREQ**2)
      PT1P=PT1P*PI/180.
      B1=CMPLX(BT1A*COS(BT1P),BT1A*SIN(BT1P))
      P1=CMPLX(PT1A*COS(PT1P),PT1A*SIN(PT1P))
```

```
      IF(IUNIT.EQ.1)BT2A=BT2A*9778.5074/(FREQ**2)
      BT2P=BT2P*PI/180.
      IF(IUNIT.EQ.1)PT2A=PT2A*9778.5074/(FREQ**2)
      PT2P=PT2P*PI/180.
      B2=CMPLX(BT2A*COS(BT2P),BT2A*SIN(BT2P))
      P2=CMPLX(PT2A*COS(PT2P),PT2A*SIN(PT2P))

C ********** ASSIGNING THE DELTA B MATRIX ********************************

B(1)=B1-A0(1,J)
      B(2)=B2-A0(1,J)

C ********** ASSIGNING THE DELTA P MATRIX ********************************

P(1)=P1-A0(2,J)
      P(2)=P2-A0(2,J)

C********************   MATRIX MULTIPLICATION FOR THE R11 AND R12

RFFV(1,J)=AINV(1,1)*B(1)+AINV(1,2)*B(2)
      RLLV(1,J)=AINV(2,1)*B(1)+AINV(2,2)*B(2)

C********************   MATRIX MULTIPLICATION FOR THE R21 AND R22
      RFFV(2,J)=AINV(1,1)*P(1)+AINV(1,2)*P(2)
      RLLV(2,J)=AINV(2,1)*P(1)+AINV(2,2)*P(2)
 503  CONTINUE
1111  CONTINUE
      CLOSE(UNIT=1)
      CLOSE(UNIT=5)

RETURN
      END
       SUBROUTINE FORM1(NFR,NMV,RA,FREQ1)
       DIMENSION RA(2,20),FREQ1(20)
       IF(NFR.EQ.8)WRITE(6,1331)(FREQ1(J),J=1,NFR),((RA(I,J),J=1,NFR),
      *I=1,NMV)
       IF(NFR.EQ.9)WRITE(6,1332)(FREQ1(J),J=1,NFR),((RA(I,J),J=1,NFR),
      *I=1,NMV)
       IF(NFR.EQ.10)WRITE(6,1333)(FREQ1(J),J=1,NFR),((RA(I,J),J=1,NFR),
      *I=1,NMV)
       IF(NFR.EQ.11)WRITE(6,1334)(FREQ1(J),J=1,NFR),((RA(I,J),J=1,NFR),
      *I=1,NMV)
       IF(NFR.EQ.12)WRITE(6,1335)(FREQ1(J),J=1,NFR),((RA(I,J),J=1,NFR),
      *I=1,NMV)
       IF(NFR.EQ.13)WRITE(6,1336)(FREQ1(J),J=1,NFR),((RA(I,J),J=1,NFR),
      *I=1,NMV)
       IF(NFR.EQ.14)WRITE(6,1337)(FREQ1(J),J=1,NFR),((RA(I,J),J=1,NFR),
      *I=1,NMV)
       IF(NFR.EQ.15)WRITE(6,1338)(FREQ1(J),J=1,NFR),((RA(I,J),J=1,NFR),
      *I=1,NMV)
       IF(NFR.EQ.16)WRITE(6,1339)(FREQ1(J),J=1,NFR),((RA(I,J),J=1,NFR),
      *I=1,NMV)
       IF(NFR.EQ.7)WRITE(6,1340)(FREQ1(J),J=1,NFR),((RA(I,J),J=1,NFR),
      *I=1,NMV)
       IF(NFR.EQ.6)WRITE(6,1341)(FREQ1(J),J=1,NFR),((RA(I,J),J=1,NFR),
      *I=1,NMV)
       IF(NFR.EQ.5)WRITE(6,1342)(FREQ1(J),J=1,NFR),((RA(I,J),J=1,NFR),
      *I=1,NMV)
       IF(NFR.EQ.4)WRITE(6,1343)(FREQ1(J),J=1,NFR),((RA(I,J),J=1,NFR),
      *I=1,NMV)
       IF(NFR.EQ.3)WRITE(6,1344)(FREQ1(J),J=1,NFR),((RA(I,J),J=1,NFR),
      *I=1,NMV)
       IF(NFR.EQ.2)WRITE(6,1345)(FREQ1(J),J=1,NFR),((RA(I,J),J=1,NFR),
      *I=1,NMV)
       IF(NFR.EQ.1)WRITE(6,1346)(FREQ1(J),J=1,NFR),((RA(I,J),J=1,NFR),
      *I=1,NMV)
```

```
      IF(NFR.EQ.17)WRITE(6,1347)(FREQ1(J),J=1,NFR),((RA(I,J),J=1,NFR),
     *I=1,NMV)
      IF(NFR.EQ.18)WRITE(6,1348)(FREQ1(J),J=1,NFR),((RA(I,J),J=1,NFR),
     *I=1,NMV)
      IF(NFR.EQ.19)WRITE(6,1349)(FREQ1(J),J=1,NFR),((RA(I,J),J=1,NFR),
     *I=1,NMV)
      IF(NFR.EQ.20)WRITE(6,1350)(FREQ1(J),J=1,NFR),((RA(I,J),J=1,NFR),
     *I=1,NMV)
 1331 FORMAT(' FREQUENCY   ',8(F4.1,1X),/' A-FLANGE    ',8(F4.2,1X),
     */' P-FLANGE    ',8(F4.2,1X))
 1332 FORMAT(' FREQUENCY   ',9(F4.1,1X),/' A-FLANGE    ',9(F4.2,1X),
     */' P-FLANGE    ',9(F4.2,1X))
 1333 FORMAT(' FREQUENCY   ',10(F4.1,1X),/' A-FLANGE    ',10(F4.2,1X),
     */' P-FLANGE    ',10(F4.2,1X))
 1334 FORMAT(' FREQUENCY   ',11(F4.1,1X),/' A-FLANGE    ',11(F4.2,1X),
     */' P-FLANGE    ',11(F4.2,1X))
 1335 FORMAT(' FREQUENCY   ',12(F4.1,1X),/' A-FLANGE    ',12(F4.2,1X),
     */' P-FLANGE    ',12(F4.2,1X))
 1336 FORMAT(' FREQUENCY   ',13(F4.1,1X),/' A-FLANGE    ',13(F4.2,1X),
     */' P-FLANGE    ',13(F4.2,1X))
 1337 FORMAT(' FREQUENCY   ',14(F4.1,1X),/' A-FLANGE    ',14(F4.2,1X),
     */' P-FLANGE    ',14(F4.2,1X))
 1338 FORMAT(' FREQUENCY   ',15(F4.1,1X),/' A-FLANGE    ',15(F4.2,1X),
     */' P-FLANGE    ',15(F4.2,1X))
 1339 FORMAT(' FREQUENCY   ',16(F4.1,1X),/' A-FLANGE    ',16(F4.2,1X),
     */' P-FLANGE    ',16(F4.2,1X))
 1340 FORMAT(' FREQUENCY   ',7(F4.1,1X),/' A-FLANGE    ',7(F4.2,1X),
     */' P-FLANGE    ',7(F4.2,1X))
 1341 FORMAT(' FREQUENCY   ',6(F4.1,1X),/' A-FLANGE    ',6(F4.2,1X),
     */' P-FLANGE    ',6(F4.2,1X))
 1342 FORMAT(' FREQUENCY   ',5(F4.1,1X),/' A-FLANGE    ',5(F4.2,1X),
     */' P-FLANGE    ',5(F4.2,1X))
 1343 FORMAT(' FREQUENCY   ',4(F4.1,1X),/' A-FLANGE    ',4(F4.2,1X),
     */' P-FLANGE    ',4(F4.2,1X))
 1344 FORMAT(' FREQUENCY   ',3(F4.1,1X),/' A-FLANGE    ',3(F4.2,1X),
     */' P-FLANGE    ',3(F4.2,1X))
 1345 FORMAT(' FREQUENCY   ',2(F4.1,1X),/' A-FLANGE    ',2(F4.2,1X),
     */' P-FLANGE    ',2(F4.2,1X))
 1346 FORMAT(' FREQUENCY   ',F4.1,1X,/' A-FLANGE    ',F4.2,1X,
     */' P-FLANGE    ',F4.2,1X)
 1347 FORMAT(' FREQUENCY   ',17(F4.1,1X),/' A-FLANGE    ',17(F4.2,1X),
     */' P-FLANGE    ',17(F4.2,1X))
 1348 FORMAT(' FREQUENCY   ',18(F4.1,1X),/' A-FLANGE    ',18(F4.2,1X),
     */' P-FLANGE    ',18(F4.2,1X))
 1349 FORMAT(' FREQUENCY   ',19(F4.1,1X),/' A-FLANGE    ',19(F4.2,1X),
     */' P-FLANGE    ',19(F4.2,1X))
 1350 FORMAT(' FREQUENCY   ',20(F4.1,1X),/' A-FLANGE    ',20(F4.2,1X),
     */' P-FLANGE    ',20(F4.2,1X))

RETURN
      END

SUBROUTINE FORM2(NFR,NMV,RA,FREQ1)

DIMENSION RA(2,20),FREQ1(20)

IF(NFR.EQ.8)WRITE(3,1331)(FREQ1(J),J=1,NFR),((RA(I,J),J=1,NFR),
     *I=1,NMV)
      IF(NFR.EQ.9)WRITE(3,1332)(FREQ1(J),J=1,NFR),((RA(I,J),J=1,NFR),
     *I=1,NMV)
      IF(NFR.EQ.10)WRITE(3,1333)(FREQ1(J),J=1,NFR),((RA(I,J),J=1,NFR),
     *I=1,NMV)
      IF(NFR.EQ.11)WRITE(3,1334)(FREQ1(J),J=1,NFR),((RA(I,J),J=1,NFR),
     *I=1,NMV)
      IF(NFR.EQ.12)WRITE(3,1335)(FREQ1(J),J=1,NFR),((RA(I,J),J=1,NFR),
     *I=1,NMV)
```

```
      IF(NFR.EQ.13)WRITE(3,1336)(FREQ1(J),J=1,NFR),((RA(I,J),J=1,NFR),
     *I=1,NMV)
      IF(NFR.EQ.14)WRITE(3,1337)(FREQ1(J),J=1,NFR),((RA(I,J),J=1,NFR),
     *I=1,NMV)
      IF(NFR.EQ.15)WRITE(3,1338)(FREQ1(J),J=1,NFR),((RA(I,J),J=1,NFR),
     *I=1,NMV)
      IF(NFR.EQ.16)WRITE(3,1339)(FREQ1(J),J=1,NFR),((RA(I,J),J=1,NFR),
     *I=1,NMV)
      IF(NFR.EQ.7)WRITE(3,1340)(FREQ1(J),J=1,NFR),((RA(I,J),J=1,NFR),
     *I=1,NMV)
      IF(NFR.EQ.6)WRITE(3,1341)(FREQ1(J),J=1,NFR),((RA(I,J),J=1,NFR),
     *I=1,NMV)
      IF(NFR.EQ.5)WRITE(3,1342)(FREQ1(J),J=1,NFR),((RA(I,J),J=1,NFR),
     *I=1,NMV)
      IF(NFR.EQ.4)WRITE(3,1343)(FREQ1(J),J=1,NFR),((RA(I,J),J=1,NFR),
     *I=1,NMV)
      IF(NFR.EQ.3)WRITE(3,1344)(FREQ1(J),J=1,NFR),((RA(I,J),J=1,NFR),
     *I=1,NMV)
      IF(NFR.EQ.2)WRITE(3,1345)(FREQ1(J),J=1,NFR),((RA(I,J),J=1,NFR),
     *I=1,NMV)
      IF(NFR.EQ.1)WRITE(3,1346)(FREQ1(J),J=1,NFR),((RA(I,J),J=1,NFR),
     *I=1,NMV)
      IF(NFR.EQ.17)WRITE(3,1347)(FREQ1(J),J=1,NFR),((RA(I,J),J=1,NFR),
     *I=1,NMV)
      IF(NFR.EQ.18)WRITE(3,1348)(FREQ1(J),J=1,NFR),((RA(I,J),J=1,NFR),
     *I=1,NMV)
      IF(NFR.EQ.19)WRITE(3,1349)(FREQ1(J),J=1,NFR),((RA(I,J),J=1,NFR),
     *I=1,NMV)
      IF(NFR.EQ.20)WRITE(3,1350)(FREQ1(J),J=1,NFR),((RA(I,J),J=1,NFR),
     *I=1,NMV)
1331  FORMAT('FREQUENCY   ',8(F4.1,1X),/'A-FLANGE    ',8(F4.2,1X),
     */'P-FLANGE    ',8(F4.2,1X))
1332  FORMAT('FREQUENCY   ',9(F4.1,1X),/'A-FLANGE    ',9(F4.2,1X),
     */'P-FLANGE    ',9(F4.2,1X))
1333  FORMAT('FREQUENCY   ',10(F4.1,1X),/'A-FLANGE    ',10(F4.2,1X),
     */'P-FLANGE    ',10(F4.2,1X))
1334  FORMAT('FREQUENCY   ',11(F4.1,1X),/'A-FLANGE    ',11(F4.2,1X),
     */'P-FLANGE    ',11(F4.2,1X))
1335  FORMAT('FREQUENCY   ',12(F4.1,1X),/'A-FLANGE    ',12(F4.2,1X),
     */'P-FLANGE    ',12(F4.2,1X))
1336  FORMAT('FREQUENCY   ',13(F4.1,1X),/'A-FLANGE    ',13(F4.2,1X),
     */'P-FLANGE    ',13(F4.2,1X))
1337  FORMAT('FREQUENCY   ',14(F4.1,1X),/'A-FLANGE    ',14(F4.2,1X),
     */'P-FLANGE    ',14(F4.2,1X))
1338  FORMAT('FREQUENCY   ',15(F4.1,1X),/'A-FLANGE    ',15(F4.2,1X),
     */'P-FLANGE    ',15(F4.2,1X))
1339  FORMAT('FREQUENCY   ',16(F4.1,1X),/'A-FLANGE    ',16(F4.2,1X),
     */'P-FLANGE    ',16(F4.2,1X))
1340  FORMAT('FREQUENCY   ',7(F4.1,1X),/'A-FLANGE    ',7(F4.2,1X),
     */'P-FLANGE    ',7(F4.2,1X))
1341  FORMAT('FREQUENCY   ',6(F4.1,1X),/'A-FLANGE    ',6(F4.2,1X),
     */'P-FLANGE    ',6(F4.2,1X))
1342  FORMAT('FREQUENCY   ',5(F4.1,1X),/'A-FLANGE    ',5(F4.2,1X),
     */'P-FLANGE    ',5(F4.2,1X))
1343  FORMAT('FREQUENCY   ',4(F4.1,1X),/'A-FLANGE    ',4(F4.2,1X),
     */'P-FLANGE    ',4(F4.2,1X))
1344  FORMAT('FREQUENCY   ',3(F4.1,1X),/'A-FLANGE    ',3(F4.2,1X),
     */'P-FLANGE    ',3(F4.2,1X))
1345  FORMAT('FREQUENCY   ',2(F4.1,1X),/'A-FLANGE    ',2(F4.2,1X),
     */'P-FLANGE    ',2(F4.2,1X))
1346  FORMAT('FREQUENCY   ',F4.1,1X,/'A-FLANGE    ',F4.2,1X,
     */'P-FLANGE    ',F4.2,1X)
1347  FORMAT('FREQUENCY   ',17(F4.1,1X),/'A-FLANGE    ',17(F4.2,1X),
     */'P-FLANGE    ',17(F4.2,1X))
1348  FORMAT('FREQUENCY   ',18(F4.1,1X),/'A-FLANGE    ',18(F4.2,1X),
     */'P-FLANGE    ',18(F4.2,1X))
```

```
 1349 FORMAT('FREQUENCY    ',19(F4.1,1X),/'A-FLANGE       ',19(F4.2,1X),
     */'P-FLANGE       ',19(F4.2,1X))
 1350 FORMAT('FREQUENCY    ',20(F4.1,1X),/'A-FLANGE       ',20(F4.2,1X),
     */'P-FLANGE       ',20(F4.2,1X))

RETURN
      END

SUBROUTINE FORM3(NFR,NMV,RA,IFREQ)

DIMENSION RA(2,20),IFREQ(20)

IF(NFR.EQ.8)WRITE(6,1331)(IFREQ(J),J=1,NFR),((RA(I,J),J=1,NFR),
     *I=1,NMV)
      IF(NFR.EQ.9)WRITE(6,1332)(IFREQ(J),J=1,NFR),((RA(I,J),J=1,NFR),
     *I=1,NMV)
      IF(NFR.EQ.10)WRITE(6,1333)(IFREQ(J),J=1,NFR),((RA(I,J),J=1,NFR),
     *I=1,NMV)
      IF(NFR.EQ.11)WRITE(6,1334)(IFREQ(J),J=1,NFR),((RA(I,J),J=1,NFR),
     *I=1,NMV)
      IF(NFR.EQ.12)WRITE(6,1335)(IFREQ(J),J=1,NFR),((RA(I,J),J=1,NFR),
     *I=1,NMV)
      IF(NFR.EQ.13)WRITE(6,1336)(IFREQ(J),J=1,NFR),((RA(I,J),J=1,NFR),
     *I=1,NMV)
      IF(NFR.EQ.14)WRITE(6,1337)(IFREQ(J),J=1,NFR),((RA(I,J),J=1,NFR),
     *I=1,NMV)
      IF(NFR.EQ.15)WRITE(6,1338)(IFREQ(J),J=1,NFR),((RA(I,J),J=1,NFR),
     *I=1,NMV)
      IF(NFR.EQ.16)WRITE(6,1339)(IFREQ(J),J=1,NFR),((RA(I,J),J=1,NFR),
     *I=1,NMV)
      IF(NFR.EQ.7)WRITE(6,1340)(IFREQ(J),J=1,NFR),((RA(I,J),J=1,NFR),
     *I=1,NMV)
      IF(NFR.EQ.6)WRITE(6,1341)(IFREQ(J),J=1,NFR),((RA(I,J),J=1,NFR),
     *I=1,NMV)
      IF(NFR.EQ.5)WRITE(6,1342)(IFREQ(J),J=1,NFR),((RA(I,J),J=1,NFR),
     *I=1,NMV)
      IF(NFR.EQ.4)WRITE(6,1343)(IFREQ(J),J=1,NFR),((RA(I,J),J=1,NFR),
     *I=1,NMV)
      IF(NFR.EQ.3)WRITE(6,1344)(IFREQ(J),J=1,NFR),((RA(I,J),J=1,NFR),
     *I=1,NMV)
      IF(NFR.EQ.2)WRITE(6,1345)(IFREQ(J),J=1,NFR),((RA(I,J),J=1,NFR),
     *I=1,NMV)
      IF(NFR.EQ.1)WRITE(6,1346)(IFREQ(J),J=1,NFR),((RA(I,J),J=1,NFR),
     *I=1,NMV)
      IF(NFR.EQ.17)WRITE(6,1347)(IFREQ(J),J=1,NFR),((RA(I,J),J=1,NFR),
     *I=1,NMV)
      IF(NFR.EQ.18)WRITE(6,1348)(IFREQ(J),J=1,NFR),((RA(I,J),J=1,NFR),
     *I=1,NMV)
      IF(NFR.EQ.19)WRITE(6,1349)(IFREQ(J),J=1,NFR),((RA(I,J),J=1,NFR),
     *I=1,NMV)
      IF(NFR.EQ.20)WRITE(6,1350)(IFREQ(J),J=1,NFR),((RA(I,J),J=1,NFR),
     *I=1,NMV)

1331 FORMAT(' SPEED(RPM) ',8(I4,1X),/' A-FLANGE       ',8(F4.2,1X),
     */' P-FLANGE       ',8(F4.2,1X))
 1332 FORMAT(' SPEED(RPM) ',9(I4,1X),/' A-FLANGE       ',9(F4.2,1X),
     */' P-FLANGE       ',9(F4.2,1X))
 1333 FORMAT(' SPEED(RPM) ',10(I4,1X),/' A-FLANGE       ',10(F4.2,1X),
     */' P-FLANGE       ',10(F4.2,1X))
 1334 FORMAT(' SPEED(RPM) ',11(I4,1X),/' A-FLANGE       ',11(F4.2,1X),
     */' P-FLANGE       ',11(F4.2,1X))
 1335 FORMAT(' SPEED(RPM) ',12(I4,1X),/' A-FLANGE       ',12(F4.2,1X),
     */' P-FLANGE       ',12(F4.2,1X))
 1336 FORMAT(' SPEED(RPM) ',13(I4,1X),/' A-FLANGE       ',13(F4.2,1X),
     */' P-FLANGE       ',13(F4.2,1X))
```

```
1337 FORMAT(' SPEED(RPM) ',14(I4,1X),/' A-FLANGE    ',14(F4.2,1X),
    */' P-FLANGE    ',14(F4.2,1X))
1338 FORMAT(' SPEED(RPM) ',15(I4,1X),/' A-FLANGE    ',15(F4.2,1X),
    */' P-FLANGE    ',15(F4.2,1X))
1339 FORMAT(' SPEED(RPM) ',16(I4,1X),/' A-FLANGE    ',16(F4.2,1X),
    */' P-FLANGE    ',16(F4.2,1X))
1340 FORMAT(' SPEED(RPM) ',7(I4,1X),/' A-FLANGE    ',7(F4.2,1X),
    */' P-FLANGE    ',7(F4.2,1X))
1341 FORMAT(' SPEED(RPM) ',6(I4,1X),/' A-FLANGE    ',6(F4.2,1X),
    */' P-FLANGE    ',6(F4.2,1X))
1342 FORMAT(' SPEED(RPM) ',5(I4,1X),/' A-FLANGE    ',5(F4.2,1X),
    */' P-FLANGE    ',5(F4.2,1X))
1343 FORMAT(' SPEED(RPM) ',4(I4,1X),/' A-FLANGE    ',4(F4.2,1X),
    */' P-FLANGE    ',4(F4.2,1X))
1344 FORMAT(' SPEED(RPM) ',3(I4,1X),/' A-FLANGE    ',3(F4.2,1X),
    */' P-FLANGE    ',3(F4.2,1X))
1345 FORMAT(' SPEED(RPM) ',2(I4,1X),/' A-FLANGE    ',2(F4.2,1X),
    */' P-FLANGE    ',2(F4.2,1X))
1346 FORMAT(' SPEED(RPM) ',I4,1X,/' A-FLANGE    ',F4.2,1X,
    */' P-FLANGE    ',F4.2,1X)
1347 FORMAT(' SPEED(RPM) ',17(I4,1X),/' A-FLANGE    ',17(F4.2,1X),
    */' P-FLANGE    ',17(F4.2,1X))
1348 FORMAT(' SPEED(RPM) ',18(I4,1X),/' A-FLANGE    ',18(F4.2,1X),
    */' P-FLANGE    ',18(F4.2,1X))
1349 FORMAT(' SPEED(RPM) ',19(I4,1X),/' A-FLANGE    ',19(F4.2,1X),
    */' P-FLANGE    ',19(F4.2,1X))
1350 FORMAT(' SPEED(RPM) ',20(I4,1X),/' A-FLANGE    ',20(F4.2,1X),
    */' P-FLANGE    ',20(F4.2,1X))

RETURN

END

SUBROUTINE FORM4(NFR,NMV,RA,IFREQ)

DIMENSION RA(2,20),IFREQ(20)

IF(NFR.EQ.8)WRITE(3,1331)(IFREQ(J),J=1,NFR),((RA(I,J),J=1,NFR),
    *I=1,NMV)
     IF(NFR.EQ.9)WRITE(3,1332)(IFREQ(J),J=1,NFR),((RA(I,J),J=1,NFR),
    *I=1,NMV)
     IF(NFR.EQ.10)WRITE(3,1333)(IFREQ(J),J=1,NFR),((RA(I,J),J=1,NFR),
    *I=1,NMV)
     IF(NFR.EQ.11)WRITE(3,1334)(IFREQ(J),J=1,NFR),((RA(I,J),J=1,NFR),
    *I=1,NMV)
     IF(NFR.EQ.12)WRITE(3,1335)(IFREQ(J),J=1,NFR),((RA(I,J),J=1,NFR),
    *I=1,NMV)
     IF(NFR.EQ.13)WRITE(3,1336)(IFREQ(J),J=1,NFR),((RA(I,J),J=1,NFR),
    *I=1,NMV)
     IF(NFR.EQ.14)WRITE(3,1337)(IFREQ(J),J=1,NFR),((RA(I,J),J=1,NFR),
    *I=1,NMV)
     IF(NFR.EQ.15)WRITE(3,1338)(IFREQ(J),J=1,NFR),((RA(I,J),J=1,NFR),
    *I=1,NMV)
     IF(NFR.EQ.16)WRITE(3,1339)(IFREQ(J),J=1,NFR),((RA(I,J),J=1,NFR),
    *I=1,NMV)
     IF(NFR.EQ.7)WRITE(3,1340)(IFREQ(J),J=1,NFR),((RA(I,J),J=1,NFR),
    *I=1,NMV)
     IF(NFR.EQ.6)WRITE(3,1341)(IFREQ(J),J=1,NFR),((RA(I,J),J=1,NFR),
    *I=1,NMV)
     IF(NFR.EQ.5)WRITE(3,1342)(IFREQ(J),J=1,NFR),((RA(I,J),J=1,NFR),
    *I=1,NMV)
     IF(NFR.EQ.4)WRITE(3,1343)(IFREQ(J),J=1,NFR),((RA(I,J),J=1,NFR),
    *I=1,NMV)
     IF(NFR.EQ.3)WRITE(3,1344)(IFREQ(J),J=1,NFR),((RA(I,J),J=1,NFR),
    *I=1,NMV)
     IF(NFR.EQ.2)WRITE(3,1345)(IFREQ(J),J=1,NFR),((RA(I,J),J=1,NFR),
    *I=1,NMV)
```

```
      IF(NFR.EQ.1)WRITE(3,1346) (IFREQ(J),J=1,NFR),((RA(I,J),J=1,NFR),
     *I=1,NMV)
      IF(NFR.EQ.17)WRITE(3,1347) (IFREQ(J),J=1,NFR),((RA(I,J),J=1,NFR),
     *I=1,NMV)
      IF(NFR.EQ.18)WRITE(3,1348) (IFREQ(J),J=1,NFR),((RA(I,J),J=1,NFR),
     *I=1,NMV)
      IF(NFR.EQ.19)WRITE(3,1349) (IFREQ(J),J=1,NFR),((RA(I,J),J=1,NFR),
     *I=1,NMV)
      IF(NFR.EQ.20)WRITE(3,1350) (IFREQ(J),J=1,NFR),((RA(I,J),J=1,NFR),
     *I=1,NMV)

1331 FORMAT('SPEED(RPM) ',8(I4,1X),/'A-FLANGE    ',8(F4.2,1X),
     */'P-FLANGE    ',8(F4.2,1X))
 1332 FORMAT('SPEED(RPM) ',9(I4,1X),/'A-FLANGE    ',9(F4.2,1X),
     */'P-FLANGE    ',9(F4.2,1X))
 1333 FORMAT('SPEED(RPM) ',10(I4,1X),/'A-FLANGE    ',10(F4.2,1X),
     */'P-FLANGE    ',10(F4.2,1X))
 1334 FORMAT('SPEED(RPM) ',11(I4,1X),/'A-FLANGE    ',11(F4.2,1X),
     */'P-FLANGE    ',11(F4.2,1X))
 1335 FORMAT('SPEED(RPM) ',12(I4,1X),/'A-FLANGE    ',12(F4.2,1X),
     */'P-FLANGE    ',12(F4.2,1X))
 1336 FORMAT('SPEED(RPM) ',13(I4,1X),/'A-FLANGE    ',13(F4.2,1X),
     */'P-FLANGE    ',13(F4.2,1X))
 1337 FORMAT('SPEED(RPM) ',14(I4,1X),/'A-FLANGE    ',14(F4.2,1X),
     */'P-FLANGE    ',14(F4.2,1X))
 1338 FORMAT('SPEED(RPM) ',15(I4,1X),/'A-FLANGE    ',15(F4.2,1X),
     */'P-FLANGE    ',15(F4.2,1X))
 1339 FORMAT('SPEED(RPM) ',16(I4,1X),/'A-FLANGE    ',16(F4.2,1X),
     */'P-FLANGE    ',16(F4.2,1X))
 1340 FORMAT('SPEED(RPM) ',7(I4,1X),/'A-FLANGE    ',7(F4.2,1X),
     */'P-FLANGE    ',7(F4.2,1X))
 1341 FORMAT('SPEED(RPM) ',6(I4,1X),/'A-FLANGE    ',6(F4.2,1X),
     */'P-FLANGE    ',6(F4.2,1X))
 1342 FORMAT('SPEED(RPM) ',5(I4,1X),/'A-FLANGE    ',5(F4.2,1X),
     */'P-FLANGE    ',5(F4.2,1X))
 1343 FORMAT('SPEED(RPM) ',4(I4,1X),/'A-FLANGE    ',4(F4.2,1X),
     */'P-FLANGE    ',4(F4.2,1X))
 1344 FORMAT('SPEED(RPM) ',3(I4,1X),/'A-FLANGE    ',3(F4.2,1X),
     */'P-FLANGE    ',3(F4.2,1X))
 1345 FORMAT('SPEED(RPM) ',2(I4,1X),/'A-FLANGE    ',2(F4.2,1X),
     */'P-FLANGE    ',2(F4.2,1X))
 1346 FORMAT('SPEED(RPM) ',I4,1X,/'A-FLANGE    ',F4.2,1X,
     */'P-FLANGE    ',F4.2,1X)
 1347 FORMAT('SPEED(RPM) ',17(I4,1X),/'A-FLANGE    ',17(F4.2,1X),
     */'P-FLANGE    ',17(F4.2,1X))
 1348 FORMAT('SPEED(RPM) ',18(I4,1X),/'A-FLANGE    ',18(F4.2,1X),
     */'P-FLANGE    ',18(F4.2,1X))
 1349 FORMAT('SPEED(RPM) ',19(I4,1X),/'A-FLANGE    ',19(F4.2,1X),
     */'P-FLANGE    ',19(F4.2,1X))
 1350 FORMAT('SPEED(RPM) ',20(I4,1X),/'A-FLANGE    ',20(F4.2,1X),
     */'P-FLANGE    ',20(F4.2,1X))

RETURN
      END

SUBROUTINE RNEW(AON,RLV,RFV,PHASE,WGHT,PTF,WTF,NBLADE,NBL,ISPEED,
     *FREQ1,FREQ2,IFREQ)
      COMMON/A1/AFI(2,20),PFI(2,20),ALI(2,20),PLI(2,20),AML0(2,20),
     #PML0(2,20),PHID,NF1,NF2,NMV,KG,KGC,PI,VMAX,DWT,RBEST,KBEST,NFR,
     @IOPT,ALIMIT

COMPLEX WT1,WT2,AON(2,20),RLV(2,20),RFV(2,20),RESP
      DIMENSION FREQ1(20),RA(2,20),PA(2,20),FREQ2(20),IFREQ(20)

C*************    FOR SELECTED FREQUENCY RANGES *************
      RTOPP=0.
      RFP=0.
```

```
C1********
      RTOPA=0.
      RFA=0.
C2********
      ANG1=PHASE*PI/180.
      ANG2=PTF*PI/180.
      WT1=CMPLX(WGHT*COS(ANG1),WGHT*SIN(ANG1))
      WT2=CMPLX(WTF*COS(ANG2),WTF*SIN(ANG2))

DO 1 J=NF1,NF2
      DO 1 I=1,NMV
      IF(KG.EQ.1)RESP=AON(I,J)+RFV(I,J)*WT1
      IF(KG.EQ.2)RESP=AON(I,J)+RLV(I,J)*WT2
      IF(KG.EQ.3)RESP=AON(I,J)+RFV(I,J)*WT1+RLV(I,J)*WT2
      RES=SQRT(REAL(RESP)**2+AIMAG(RESP)**2)
      RA(I,J)=RES
      PA(I,J)=ATAN2(AIMAG(RESP),REAL(RESP))*180./PI
      IF(PA(I,J).LT.-180.)PA(I,J)=PA(I,J)+360.
      IF(PA(I,J).GT.180.)PA(I,J)=PA(I,J)-360.

IF(I.EQ.1.AND.RES.GT.RFA)RFA=RES
      IF(I.EQ.2.AND.RES.GT.RFP)RFP=RES
 1    CONTINUE
      RTOPA=RFA
      RTOPP=RFP

C*************   FOR ALL FREQUENCY RANGE     *********
      RTOPPN=0.
      RFP=0.
C1********
      RTOPAN=0.
      RFA=0.
C2********

DO 2 J=1,NFR
      DO 2 I=1,NMV
      IF(KG.EQ.1)RESP=AON(I,J)+RFV(I,J)*WT1
      IF(KG.EQ.2)RESP=AON(I,J)+RLV(I,J)*WT2
      IF(KG.EQ.3)RESP=AON(I,J)+RFV(I,J)*WT1+RLV(I,J)*WT2
      RES=SQRT(REAL(RESP)**2+AIMAG(RESP)**2)
      RA(I,J)=RES
      PA(I,J)=ATAN2(AIMAG(RESP),REAL(RESP))*180./PI
      IF(PA(I,J).LT.-180.)PA(I,J)=PA(I,J)+360.
      IF(PA(I,J).GT.180.)PA(I,J)=PA(I,J)-360.

IF(I.EQ.1.AND.RES.GT.RFA)FREQA=FREQ1(J)
      IF(I.EQ.1.AND.RES.GT.RFA)RFA=RES
      IF(I.EQ.2.AND.RES.GT.RFP)FREQP=FREQ1(J)
      IF(I.EQ.2.AND.RES.GT.RFP)RFP=RES
 2    CONTINUE
      RTOPAN=RFA
      FTOPAN=FREQA
      RTOPPN=RFP
      FTOPPN=FREQP

IF(ISPEED.EQ.1.AND.KG.EQ.1)GOTO 10
      IF(ISPEED.EQ.1.AND.KG.EQ.2)GOTO 11
      IF(ISPEED.EQ.1.AND.KG.EQ.3)GOTO 12
      IF(ISPEED.EQ.2.AND.KG.EQ.1)GOTO 20
      IF(ISPEED.EQ.2.AND.KG.EQ.2)GOTO 21
      IF(ISPEED.EQ.2.AND.KG.EQ.3)GOTO 22
      GOTO 100

10   WRITE(3,101)WGHT,NBLADE,PHASE
      WRITE(3,102)RTOPP,FREQ2(NF1),FREQ2(NF2),RTOPPN,FTOPPN
```

```
101  FORMAT('FAN CORRECTIVE WEIGHT. = ',F5.2,'(OZ-IN)  AT BLADE # ',
     !I2,'(',F7.3,' DEG.',') ')

102  FORMAT(/'MAX P-FLANGE VIB = ',F6.3,' MILS  IN ( ',F7.3,
     *' HZ  TO ',F7.3,' HZ)  ',/'MAX P-FLANGE VIB = ',F6.3,
     &' MILS IN ALL FREQUENCY RANGE AT ',F7.3,' HZ',/)

WRITE(6,103)WGHT,NBLADE,PHASE
     WRITE(6,104)RTOPP,FREQ2(NF1),FREQ2(NF2),RTOPPN,FTOPPN

103  FORMAT(' FAN CORRECTIVE WEIGHT. = ',F5.2,'(OZ-IN)  AT BLADE # ',
     !I2,'(',F7.3,' DEG.',') ')

104  FORMAT(/' MAX P-FLANGE VIB = ',F6.3,' MILS  IN ( ',F7.3,
     *' HZ  TO ',F7.3,' HZ)  ',/' MAX P-FLANGE VIB = ',F6.3,
     &' MILS IN ALL FREQUENCY RANGE AT ',F7.3,' HZ',/)

GOTO 100

11   WRITE(3,201)WTF,NBL,PTF
     WRITE(3,102)RTOPP,FREQ2(NF1),FREQ2(NF2),RTOPPN,FTOPPN

201  FORMAT('LPT CORRECTIVE WEIGHT. = ',F5.2,'(OZ-IN)  AT BLADE # ',
     !I2,'(',F7.3,' DEG.',') ')

WRITE(6,203)WTF,NBL,PTF
     WRITE(6,104)RTOPP,FREQ2(NF1),FREQ2(NF2),RTOPPN,FTOPPN

203  FORMAT(' LPT CORRECTIVE WEIGHT. = ',F5.2,'(OZ-IN)  AT BLADE # ',
     !I2,'(',F7.3,' DEG.',') ')

GOTO 100

12   WRITE(3,301)WGHT,NBLADE,PHASE,WTF,NBL,PTF
     WRITE(3,102)RTOPP,FREQ2(NF1),FREQ2(NF2),RTOPPN,FTOPPN

301  FORMAT('FAN CORRECTIVE WEIGHT = ',F5.2,'(OZ-IN)  AT BLADE # ',I2,
     #'(',F7.3,' DEG.)   PLUS ',/,'LPT CORRECTIVE WEIGHT = ',F5.2,
     @'(OZ-IN) ','AT BLADE # ',I3,'(',F7.3,' DEG.)')

WRITE(6,303)WGHT,NBLADE,PHASE,WTF,NBL,PTF
     WRITE(6,104)RTOPP,FREQ2(NF1),FREQ2(NF2),RTOPPN,FTOPPN

303  FORMAT(' FAN CORRECTIVE WEIGHT = ',F5.2,'(OZ-IN)  AT BLADE # ',I2,
     #'(',F7.3,' DEG.)   PLUS ',/,' LPT CORRECTIVE WEIGHT = ',F5.2,
     @'(OZ-IN) ','AT BLADE # ',I3,'(',F7.3,' DEG.)')

GOTO 100

20   IFRM=FTOPPN*60
     WRITE(3,1101)WGHT,NBLADE,PHASE

WRITE(3,1102)RTOPP,IFREQ(NF1),IFREQ(NF2),RTOPPN,IFRM

1101 FORMAT('FAN CORRECTIVE WEIGHT. = ',F5.2,'(OZ-IN)  AT BLADE # ',
     !I2,'(',F7.3,' DEG.',') ')

1102 FORMAT(/'MAX P-FLANGE VIB = ',F6.3,' MILS IN  ( ',I4,
     @' RPM  TO ',I4,' RPM)  ',/'MAX P-FLANGE VIB = ',F6.3,' MILS IN',
     *' ALL SPEED RANGE AT ',I4,' RPM',/)

WRITE(6,1103)WGHT,NBLADE,PHASE
     WRITE(6,1104)RTOPP,IFREQ(NF1),IFREQ(NF2),RTOPPN,IFRM
```

```
1103 FORMAT(' FAN CORRECTIVE WEIGHT. = ',F5.2,'(OZ-IN)  AT BLADE # ',
     !I2,'(',F7.3,' DEG.',') ')

1104 FORMAT(/' MAX P-FLANGE VIB = ',F6.3,' MILS IN  ( ',I4,
     @' RPM  TO ',I4,' RPM) ',/' MAX P-FLANGE VIB = ',F6.3,' MILS IN',
     *' ALL SPEED RANGE AT ',I4,' RPM',/)

GOTO 100

21 IFRM=FTOPPN*60
     WRITE(3,1201)WTF,NBL,PTF
     WRITE(3,1102)RTOPP,IFREQ(NF1),IFREQ(NF2),RTOPPN,IFRM

1201 FORMAT('LPT CORRECTIVE WEIGHT. = ',F5.2,'(OZ-IN)  AT BLADE # ',
     !I2,'(',F7.3,' DEG.',') ')

WRITE(6,1203)WTF,NBL,PTF
     WRITE(6,1104)RTOPP,IFREQ(NF1),IFREQ(NF2),RTOPPN,IFRM

1203 FORMAT(' LPT CORRECTIVE WEIGHT. = ',F5.2,'(OZ-IN)  AT BLADE # ',
     !I2,'(',F7.3,' DEG.',') ')

GOTO 100

22 IFRM=FTOPPN*60
     WRITE(3,1301)WGHT,NBLADE,PHASE,WTF,NBL,PTF
     WRITE(3,1102)RTOPP,IFREQ(NF1),IFREQ(NF2),RTOPPN,IFRM

1301 FORMAT('FAN CORRECTIVE WEIGHT = ',F5.2,'(OZ-IN)  AT BLADE # ',I2,
     #'(',F7.3,' DEG.)  PLUS ',/,'LPT CORRECTIVE WEIGHT = ',F5.2,
     @'(OZ-IN)  ','AT BLADE # ',I3,'(',F7.3,' DEG.)')

WRITE(6,1303)WGHT,NBLADE,PHASE,WTF,NBL,PTF
     WRITE(6,1104)RTOPP,IFREQ(NF1),IFREQ(NF2),RTOPPN,IFRM

1303 FORMAT(' FAN CORRECTIVE WEIGHT = ',F5.2,'(OZ-IN)  AT BLADE # ',I2,
     #'(',F7.3,' DEG.)  PLUS ',/,' LPT CORRECTIVE WEIGHT = ',F5.2,
     @'(OZ-IN)  ','AT BLADE # ',I3,'(',F7.3,' DEG.)')

100 CONTINUE
     RETURN
     END
```

What is claimed is:

1. For balancing a body that is rotatable about an elongated axis of rotation, said body having a plurality of stages distributed along its length which are correspondingly rotatable about said axis, with at least one stage (f) of said plurality of stages being accessible for physically applying a balancing weight ($\Delta \overline{WGT}_f$) thereto, said balancing weight having a certain magnitude ($|\Delta \overline{WGT}_f|$) and angular orientation ($\phi_f$), a method of determining the optimum magnitude and angular orientation for said balancing weight ($\Delta \overline{WGT}_f$), comprising:

(1) providing at least one vibration sensor that is operative to sense vibration at a certain pickup location (i) relative to said body as said body rotates;

(2) using said sensor to measure as-built vibration ($\overline{U}_i$) at said pickup location (i) as said body is rotated at varying rates of rotation (RPMs) within and across a certain range of RPMs, said as-built vibration ($\overline{U}_i$) having both a magnitude ($|\overline{U}_i|$) and phase ($\phi_i$), and determining from said measured vibration ($\overline{U}_i$) a maximum as-built vibrational amplitude ($U_{max}$) at said pickup location (i) for said range of RPMs;

(3) arbitrarily selecting a desired vibrational amplitude (D) at said pickup location (i) that is less than the maximum as-built vibrational amplitude ($U_{max}$) determined in the preceding step;

(4) calculating a common limit of angular orientations for said range of RPMs for placing said balancing weight ($\Delta\overline{WGT}_f$) on said accessible stage (f) of said body, said limit defining a minimum range where said angular orientation ($\phi_f$) of said balancing weight ($\Delta\overline{WGT}_f$) must be positioned relative to said accessible stage (f), in order to reduce the magnitude of vibration at said pickup location (i) to a level that is at or below said desired vibrational amplitude (D);

(5) calculating a lower and higher limit of weight magnitude ($|\Delta\overline{WGT}_f|$) for said balancing weight ($\Delta\overline{WGT}_f$) for any angular orientation ($\phi_f$) of said balancing weight ($\Delta\overline{WGT}_f$) that is within the common limit calculated in the preceding step, said lower and higher limits of weight magnitude defining a range of weight magnitudes within which said magnitude ($|\Delta\overline{WGT}_f|$) of said balancing weight ($\Delta\overline{WGT}_f$) must fall in order to reduce vibration at said pickup location (i) to a level that is at or below said desired vibrational amplitude (D), including using the following equation:

$$\left[X + \frac{|U_i|\cos(\theta)}{|R_{if}|}\right]^2 + \left[Y + \frac{|U_i|\sin(\theta)}{|R_{if}|}\right]^2 = \left[\frac{D}{|R_{if}|}\right]^2$$

wherein:
$X = \Delta\overline{WGT}_f * \cos\phi_f$
$Y = \Delta\overline{WGT}_f * \sin\phi_f$
$R_{if}$ = predetermined influence coefficient at pickup location (i) as a result of as-built unbalance at accessible stage (f), such influence coefficient having a predetermined magnitude and phase ($\Psi_{if}$)
$\theta = \phi_i - \Psi_{if}$ (6) calculating the best achievable balanced vibrational amplitude ($D_{min-max}$) at pickup location (i) from the range of lower and higher limits of weight magnitude calculated in the preceding step; and (7) selecting the balancing weight magnitude ($|\Delta\overline{WGT}_f|$) and angular orientation ($\phi_f$) that provides $D_{min-max}$, and applying said selected weight to said accessible stage (f).

2. The method of claim 1, wherein said at least one accessible stage (f) is a first accessible stage of said rotatable body, and wherein said body has a second accessible stage (t), and further including balancing said rotatable body by physically applying a second balancing weight ($\Delta\overline{WGT}_t$) to said second stage (t), including:

(8) arbitrarily selecting an initial weight magnitude ($|\Delta\overline{WGT}_t|$) and angular orientation ($\phi_t$) for said second balancing weight ($\Delta\overline{WGT}_t$);

(9) calculating a new maximum as-built vibrational amplitude ($U_{max}$)$_{new}$ from a modified as-built vibration ($\overline{U}_i$) at pickup location (i) by taking into account the vibrational influence at said pickup location (i) caused by applying said second balancing weight ($\Delta\overline{WGT}_t$) to said second stage (t), including using the following equation:

$$(U_i)_{new} = U_i + R_{it} \times \Delta WGT_t$$

wherein:
($\overline{U}_i$) = measured as-built vibration at pickup location (i); and
($\overline{R}_{it}$) = predetermined influence coefficient at pickup location (i) as a result of as-built imbalance at second accessible stage (t)

(10) arbitrarily selecting a desired vibrational amplitude (D)$_{new}$ at said pickup location (i) that is less than the maximum as-built vibrational amplitude ($U_{max}$)$_{new}$ calculated in the preceding step;

(11) repeating steps (4)-(6) to calculate the best achievable balanced vibrational amplitude ($D_{min-max}$) and the corresponding magnitude ($|\Delta\overline{WGT}_f|$) and angular orientation ($\phi_f$) of said first balancing weight ($\Delta\overline{WGT}_f$) that would be placed at said first stage (f) in combination with placement of said arbitrarily selected second balancing weight ($\Delta\overline{WGT}_t$) on said second stage (t);

(12) incrementing both the weight magnitude ($|\Delta\overline{WGT}_t|$) and angular orientation ($\phi_t$) of said second balancing weight ($\Delta\overline{WGT}_t$) selected in step (8) above through a certain range of weight magnitudes, and through a certain range of angular orientations, and for each incrementation, repeating steps (9)-(11) above to obtain a best ($D_{min-max}$) value for each incrementation; followed by

(13) selecting the best achievable ($D_{min-max}$) value from all of said incrementations, and the corresponding corrective weight magnitudes and phases for both weights ($\Delta\overline{WGT}_f$, $\Delta\overline{WGT}_t$), and applying said balancing weights to their respective stages (f, t).

3. A method for balancing a high-bypass gas turbine engine, said engine having a plurality of stages, including a forward, fan stage, and a rearward low pressure turbine stage, and a plurality of other stages located generally in between said fan and turbine stages, said plurality of other stages normally being physically inaccessible for placement of balancing weights thereupon, said method comprising:

(1) providing at least one vibration sensor that is operative to sense engine vibration at a certain pickup location (i) relative to said engine while said engine is in operation;

(2) using said sensor to measure as-built vibration ($\overline{U}_i$) of said engine at said pickup location (i) for a range of engine operating speeds (RPMs), said as-built vibration ($\overline{U}_i$) having both a magnitude component ($|\overline{U}_i|$) and a phase component ($\phi_i$), and determining from said measured vibration ($\overline{U}_i$) a maximum as-built vibrational amplitude ($\overline{U}_{max}$) at said pickup location (i) for said range of RPMs;

(3) arbitrarily selecting a desired vibrational amplitude (D) at said pickup location (i) that is less than the maximum as-built vibrational amplitude ($U_{max}$) determined in the preceding step;

(4) calculating a common limit of angular orientations for said range of RPMs for placing a balancing weight ($\Delta\overline{FAN}$) on said fan stage, said limit defining a minimum range where said balancing weight ($\Delta\overline{FAN}$) must be angularly oriented ($\phi_f$) relative to said fan stage, in order to reduce the magnitude of vibration at said pickup location (i) to a level that is at or below said desired vibrational amplitude (D);

(5) calculating the lower and higher limits of the magnitude ($|\Delta\overline{FAN}|$) of said balancing weight ($\Delta\overline{FAN}$) for any angular orientation ($\phi_f$) within the common limit calculated in the preceding step, said lower and higher limits of weight magnitude defining a range of weight magnitudes within which said balancing weight ($\Delta\overline{FAN}$) must fall in order to reduce vibration at said pickup location (i) to a level that is at or below said desired vibrational amplitude (D), including using the following equation:

$$\left[X + \frac{|U_i| \cos(\theta)}{|R_{if}|}\right]^2 + \left[Y + \frac{|U_i| \sin(\theta)}{|R_{if}|}\right]^2 = \left[\frac{D}{|R_{if}|}\right]^2$$

wherein:
$X = \Delta\overline{FAN} * \cos \phi_f$
$Y = \Delta\overline{FAN} * \sin \phi_f$
$\overline{R}_{if}$ = predetermined influence coefficient at pickup location (i) as a result of as-built unbalance at accessible stage (f), such influence coefficient having a predetermined magnitude and phase ($\Psi_{if}$)
$\theta = \phi_i - \Psi_{if}$ (6) calculating the best achievable balanced vibrational amplitude ($D_{min-max}$) at pickup location (i) from the range of lower and higher limits of weight magnitude calculated in the preceding step; and (7) selecting the weight magnitude ($|\Delta\overline{FAN}|$) and angular orientation ($\phi_f$) thereof that provide $D_{min-max}$, and applying said selected weight to said fan stage.

4. The method of claim 3, further including balancing said high-bypass gas turbine engine by physically applying a second balancing weight ($\Delta\overline{LPT}$) to said turbine stage of said engine, including:

(8) arbitrarily selecting an initial weight magnitude ($|\Delta\overline{LPT}|$) and angular orientation ($\phi_t$) for said second balancing weight ($\Delta\overline{LPT}$);

(9) calculating a new maximum as-built vibrational amplitude ($U_{max})_{new}$ from a modified as-built vibration ($\overline{U}_i$) at pickup location (i) by taking into account the vibrational influence at said pickup location (i) caused by applying said second balancing weight ($\Delta\overline{LPT}$) to said turbine stage, including using the following equation:

$$(U_i)_{new} = U_i + R_{it} \times \Delta LPT$$

wherein:
($\overline{U}_i$) = measured as-built vibration at pickup location (i); and
($\overline{R}_{it}$) = predetermined influence coefficient at pickup location (i) as a result of as-built imbalance at turbine stage

(10) arbitrarily selecting a desired vibrational amplitude ($D)_{new}$ at said pickup location (i) that is less than the maximum as-built vibrational amplitude ($U_{max})_{new}$ calculated in the preceding step;

(11) repeating steps (4)–(6) to calculate the best achievable balanced vibrational amplitude ($D_{min-max}$) and the corresponding magnitude ($|\Delta\overline{FAN}|$) and angular orientation ($\phi_f$) of said first balancing weight ($\Delta\overline{FAN}$) that would be placed on said fan stage in combination with placement of said arbitrarily selected second balancing weight ($\Delta\overline{LPT}$) on said turbine state;

(12) incrementing both the weight magnitude ($|\Delta\overline{LPT}|$) and angular orientation ($\phi_t$) of said second balancing weight ($\Delta\overline{LPT}$) selected in step (8) above through a certain range of weight magnitudes, and through a certain range of angular orientations, and for each incrementation, repeating steps (9)–(11) above to obtain a best ($D_{min-max}$) value for each incrementation; followed by

(13) selecting the best ($D_{min-max}$) value from all of said incrementations, and the corresponding corrective weight magnitudes and phases for both weights ($\Delta\overline{FAN}, \Delta\overline{LPT}$), and applying said balancing weights to said fan and turbine stages.

* * * * *

UNITED STATES PATENT AND TRADEMARK OFFICE
CERTIFICATE OF CORRECTION

PATENT NO. : 5,172,325
DATED : December 15, 1992
INVENTOR(S) : Mohammad A. Heidari It is certified that error appears in the above-indentified patent and that said Letters Patent is hereby corrected as shown below:

On the title page, Item [57]: Abstract, line 4, "stage" should be --stages--.
Column 2, line 58, "tha" should be --than--.
Claim 2, Column 79, line 64, should read:

$$(\overline{U_i})_{new} = \overline{U_i} + \overline{R_{it}} \times \Delta \overline{WGT_t}$$

Claim 3, column 81, line 5, should read:

$$\left[ X + \frac{|\overline{U_i}| \cos(\theta)}{|\overline{R_{if}}|} \right]^2 + \left[ Y + \frac{|\overline{U_i}| \sin(\theta)}{|\overline{R_{if}}|} \right]^2 = \left[ \frac{D}{|\overline{R_{if}}|} \right]^2$$

Claim 4, column 82, line 24, "state" should be -- stage --.

Signed and Sealed this

Twenty-ninth Day of March, 1994

Attest:

BRUCE LEHMAN

*Attesting Officer*     *Commissioner of Patents and Trademarks*